United States Patent [19]

Matsui et al.

[11] Patent Number: 5,751,349
[45] Date of Patent: May 12, 1998

[54] WHITE BALANCE CONTROL DEVICE AND METHOD USING A VARIABLE REGION TO REDUCE DETERIORATION OF REPRODUCED COLOR WHEN A USER MANUALLY SELECTS A LIGHT SOURCE

[75] Inventors: Seiichi Matsui; Yoshio Nakane; Kenji Saito, all of Tokyo, Japan

[73] Assignee: Fuji Photo Film Co., Ltd., Kanagawa, Japan

[21] Appl. No.: 698,423

[22] Filed: Aug. 15, 1996

Related U.S. Application Data

[62] Division of Ser. No. 447,730, May 23, 1995, Pat. No. 5,565,913, which is a division of Ser. No. 922,488, Jul. 31, 1992, Pat. No. 5,329,361, which is a division of Ser. No. 245,689, May 18, 1994, Pat. No. 5,488,292.

[30] Foreign Application Priority Data

Sep. 4, 1991 [JP] Japan .................. 3-224435
Sep. 4, 1991 [JP] Japan .................. 3-224439

[51] Int. Cl.⁶ ............................................. H04N 9/73
[52] U.S. Cl. ........................ 348/228; 348/224; 348/225
[58] Field of Search ........................ 348/223, 224, 348/225, 226, 227, 228, 655, 656, 657; H04N 9/73

[56] References Cited

U.S. PATENT DOCUMENTS

| | | |
|---|---|---|
| 5,040,054 | 8/1991 | Schmidt et al. . |
| 5,099,316 | 3/1992 | Ogawa . |
| 5,146,316 | 9/1992 | Suzuki . |
| 5,177,599 | 1/1993 | Takagi et al. . |
| 5,223,921 | 6/1993 | Haruki et al. .................. 348/665 |
| 5,260,774 | 11/1993 | Takayama . |
| 5,264,921 | 11/1993 | Jinnai . |
| 5,267,026 | 11/1993 | Kawahara et al. . |
| 5,270,802 | 12/1993 | Takagi et al. .................. 348/223 X |
| 5,272,521 | 12/1993 | Tatsumi . |
| 5,274,440 | 12/1993 | Miyazaki . |
| 5,282,022 | 1/1994 | Haruki et al. .................. 348/223 |
| 5,298,979 | 3/1994 | Kim ............................ 348/223 X |
| 5,313,277 | 5/1994 | Suzuki ......................... 348/223 X |
| 5,319,449 | 6/1994 | Saito et al. .................... 348/228 X |

FOREIGN PATENT DOCUMENTS

| | | |
|---|---|---|
| 0-148988 | 6/1991 | Japan . |
| 3-255796 | 11/1991 | Japan . |
| 3-270395 | 12/1991 | Japan . |
| 3-289793 | 12/1991 | Japan . |
| 4-170887 | 6/1992 | Japan . |

*Primary Examiner*—John K. Peng
*Assistant Examiner*—John W. Miller

[57] ABSTRACT

A white balance control device is provided for use in a video camera or a still video camera in which white balance control signals are controlled so that an object may be photographed without the occurrence of color failure. A user selects the light source to be employed. A microcomputer of the white balance control device detects a difference between integral averaged values for two color difference signals R–Y and B–Y and a reference value. The integral averaged values are to be equalized until this difference is within a predetermined value. The integral averaged values are also to be maintained within a variable region in accordance with the selected light source. Use of the variable region insures that deterioration of the reproduced color does not occur even when there is a difference between a selected light source and an actual color temperature.

14 Claims, 17 Drawing Sheets

WHITE BALANCE CONTROL DEVICE AND METHOD USING A VARIABLE REGION TO REDUCE DETERIORATION OF REPRODUCED COLOR WHEN A USER MANUALLY SELECTS A LIGHT SOURCE

This application is a divisional of application Ser. No. 08/447,730, filed on May 23, 1995, now U.S. Pat. No. 5,565,913 which is a divisional of Ser. No. 07/922,488 filed on Jul. 31, 1992 now U.S. Pat. No. 5,329,361 which is a divisional of Ser. No. 08/245,689 filed on May 18, 1994 now U.S. Pat. No. 5,488,292 of the entire contents of which are hereby incorporated by reference.

BACKGROUND OF THE INVENTION

1. [Field of the Invention]

The present invention relates to a white balance control device of a video camera and a video still camera, and particularly to a white balance control device for properly controlling white balance by a method of inside light measurement without color failure occurring, a white balance control device for accurately controlling white balance by reducing the white balance converging period, a white balance control device for properly controlling white balance control by a method of inside light measurement without color failure occurring when photographing indoors and outdoors, a white balance control device with a device for selecting a light source by manual operation in order to prevent deterioration of reproduced colors caused by a difference between a data of a selected light source and an acutal color temperature of the selected light source.

2. [Related Art]

In conventional video cameras and video still cameras, a white balance control is utilized in order to reproduce a white object as a white colored material. The white balance control is operated by controlling a gain of a red signal circuit and a gain of a blue signal circuit in the camera based on a green signal as a reference value.

In the white balance control, it is necessary to measure a tint (color temperature) of a photographing working field for operating the white balance control. As methods of the white balance control, there are an outside light measuring method and an inside light measuring method, which are different from each other in measuring the color temperature of the photographing working field.

In the outside light measuring method, a color temperature is directly detected by a color temperature sensor. A white balance control signal for a red signal and a white balance control for a blue signal are produced based on reference data detected by the color temperature sensor in order to control the white balance. The color temperature sensor is integrally formed with photosensors, for example, a photo sensor with a red filter, a photo sensor with a green filter and a photo sensor with a blue filter. The white balance control for the blue signal are produced by an output voltage of each photo sensor, respectively.

In the inside light measuring method, a color temperature is indirectly detected by a color temperature sensor. If a white balance is matching in a picture, an averaged color of whole colors in a picture becomes achromatic color (grey). The inside light measuring method utilizes this theory. That is, an integrated averaged value of color difference signals R−Y and B−Y at a reference color temperature that an averaged color for all of the colors in a picture becomes an achromatic color is designated as a reference value for each signal. Thus, gains of the red signal and the blue signal are controlled in order to match the integrated averaged value with the reference value.

The above described values of the white balance control for a red signal and the white balance control for a blue signal are calculated by a device, such as a microcomputer and then white balance control signals for a red signal and a blue signal are output from the microcomputer to a white balance circuit. In the white balance circuit, gains of a red signal and a blue signal are controlled based on values of the white balance control signals.

On the other hand, in a manual white balance method, an operator detects a kind of light source (for example, sunshine, electric bulb, fluorescent lamp and so on) in a photographing field by himself and then the operator selects the kind of the light source by manually operating a device for selecting a light source, such as a switch. In accordance with a selection of the light source, gains of the red signal circuit and the blue signal circuit are set at specific gains corresponding to the kinds of the light sources.

The condition in which an averaged color becomes an achromatic color (grey) in a picture is achieved when the video camera takes a photograph of an ordinal sight in which various colors are mixed randomly. However, when the video camera takes a photograph of an object having a background of a blue sky, a blue ocean or a red wall, the above described condition cannot be accomplished. An averaged color for all of the colors in a picture is not an achromatic color, the averaged color becomes a color with a blue tint or a red tint. If the video camera takes a photograph of a sight dominated by a mono-colored background, the averaged color of the picture is recognized as the achromatic color by a white balance control in the inside light measuring method, although an averaged color in a picture is not an achromatic color. As a result, a reference white level is only slightly different from the true white level. The color of the background is discolored and a color of a main object (person) is controlled to be shifted to its additive complementary color (additive complementary color against the background), and a so called "color failure" occurs.

As a result, in an inside light measurement control, a video camera with a white balance control unit takes a photograph of an ordinal sight in which various colors are mixed randomly, so that the white balance control is operated properly. On the other hand, when the video camera takes a photograph of a specific sight in which a specific color dominates, the above described color failure occurs.

In a conventional automatic white balance control device, white balance control signals are output with predetermined intervals. If the predetermined intervals of the output white balance control signals are too short, the white balance control signals are not accurately converged by the occurrence of hunting. On the other hand, if the predetermined intervals of the output balance control signals are too long, the device spends a large amount of time to converge, although the white balance control signals are accurately converged. Therefore, some of the following problems arise for example. Such as, if a color temperature is suddenly changed or a light source is turned on, the device needs to spend a long time for operating white balance normally in the case when the white balance control signals should be converged as early as possible.

In the above described conventional manual white balance method, gains of the red signal circuit and the blue signal circuit are set to the specific value which depends on the kinds of the light sources. Even if the same kind of the light source is selected, a deterioration of reproduced colors occurrs by a difference between a predetermined value of a selected light source and an actual color temperature, because there are various fluorescent lamp types and colors associated with a camera which have undesirable influences.

OBJECTS OF THE PRESENT INVENTION

Upon reviewing the conventional art, one object of the present invention is to provide a white balance control device for photographing a sight in which one specific color dominates without color failure occurring.

Another object of the present invention is to provide a white balance control device for photographing a sight in which one specific color dominates without color failure occurring, and particularly to a white balance control device for properly controlling white balance when an object is photographed under a light source or without a light source.

A further object of the present invention is to provide a white balance control device for accurately controlling white balance simultaneously with shortening a converging period.

A still further object of the present invention is to provide a white balance control device for photographing a sight in which one specific color dominates without color failure occurring, and particularly to a white balance control device for properly controlling white balance when an object is photographed indoors or outdoors.

Another object of the present invention is to provide a white balance control device for properly controlling white balance with a manual operation.

SUMMARY OF THE INVENTION

To accomplish the above objects, a white balance control device in an inside light measurement control method of an embodiment of the present invention comprises white balance control means for controlling white balance by controlling an amplification degree of a red elementary color signal and a blue elementary color signal of red-, green-, and blue-elementary color signals, color matrixing means for outputting first and second color difference signals by processing the elementary color signal white balance controlled by said white balance control means, processing means for detecting a brightness of an object simultaneously with transmitting white balance control signals to the white balance control means, wherein the white balance control means is actuated in order to equalize integral averaged values of the first and second color difference signals, and reference values and predetermined integral averaged values for each first and second color difference signal are set as the reference values when an averaged color of all colors in a picture becomes an achromatic color at a reference color temperature, and controlling means for stepping up and down values of the white balance control signals after a battery source is turned on and values of the white balance control signals converge in a condition that the values of the white balance control signals are varied within a variable region of which a center point is the previous converged value or a value of a previous fixed time, when the differences between the integral averaged values for the first and second color difference signals and the reference values are more than predetermined values and a present brightness value is changed more than a predetermined value with respect to a value of the previous brightness or a brightness at a previous fixed time, wherein the processing means fixes the values of the white balance control signals while the stepped up and down values of the white balance control signals become a boundary value or the values of the white balance control signals are fixed or converged within the variable region, and the variable region is renewed to a new variable region of which a center point is the present fixed values or present converged values.

A white balance control device of another embodiment of the present invention comprises processing means for detecting whether a photographing condition is suitable for a telescope condition or a wide condition and narrowing a variable region in the telescope condition and enlarging the variable region in the wide condition.

To accomplish the above object, a structure of a white balance control device of a different embodiment in an inside light measurement control method of the present invention comprises white balance control means for controlling white balance by controlling an amplification degree of a red elementary color signal and a blue elementary color signal out of red-, green-, and blue-elementary color signals, color matrixing means for outputting first and second color difference signals by processing elementary color signals white balance controlled by said white balance control means, processing means for transmitting white balance control signals to the white balance control means,wherein the white balance control means is actuated in order to equalize integral averaged values of the first and second color difference signals, and reference values and predetermined integral averaged values for each first and second color difference signals are set as the reference values when an averaged color of all colors in a picture becomes an achromatic color at a reference color, controlling means for inputting zoom information after a battery source is turned on and a value of white balance control signals converges, wherein the processing means increases the reference values when a zooming position is in a telescope condition or a brightness value of an object is high, the processing means decreases the reference values when the zooming position is in a wide condition or the brightness value of an object is low so that a recognize level for changing a brightness value can be determined and the values of the white balance control signals are changed in order to equalize the integral averaged values of each first and second color difference signal and the respective reference values when a difference between a present brightness value and a brightness value at the last converged time is more than the recognize level for changing the brightness value.

To accomplish the above objects, a structure of a white balance control device of another embodiment-of the present invention comprises white balance control means for controlling white balance by controlling an amplification degree of a red elementary color signal and a blue elementary color signal out of red-, green-, and blue-elementary color signals, color matrixing means for outputting first and second color difference signals by processing elementary color signals white balance controlled by said white balance control means, and processing means for transmitting white balance control signals to the white balance control means, wherein the white balance control means is actuated in order to equalize integral averaged values of the first and second color difference signals, and reference values and predetermined integral averaged values for each first and second color difference signal are set as the reference values when an averaged color of all colors in a picture becomes an achromatic color at a reference color temperature, the processing means outputting an interval of a white balance control signal of which a value is changed by one step value longer after a difference between the integral averaged values of the first and second color difference signals and the reference values are less than a predetermined level for changing or values of the white control signals are converged once.

To accomplish the above objects, a structure of a white balance control device of a different embodiment in an inside light measurement method of the present invention comprises, brightness detecting means for detecting a brightness value of an object and for selecting an outdoor mode for phtographing properly outdoors when the brightness value of the object is higher than a level for changing modes, and an indoor mode for photographing properly indoors under an artificial light such as a fluorescent lamp and an incandescent lamp when the brightness of the object is less than the level for changing modes, controlling means for controlling white balance within a selected restricted region by detecting a color temperature of sunshine in the outdoor mode and white balance within a selected restricted region by considering a color temperature of the respective artifical light in the indoor mode. and after the values of white balance control signals converged to a value corresponding to the outdoor mode, and changing means for changing values of white balance control signals to a value corresponding to the indoor mode after the values of the white balance control signals converge to a value corresponding to the outdoors mode when a brightness value of an object is less than a value for mode changing and the differences between integral averaged values of the first and second color difference signals and the reference values are more than a level for detecting an expanding/converging value, and changing values of the white balance control signals to a value corresponding to the outdoor mode after the values of the white balance control signals converge to a value corresponding to the indoor mode when a brightness value of an object is higher than a value for changing and differences between the integral averaged values of the first and second color difference signals and the reference values are more than a level for detecting the expanding/converging value.

To accomplish the above objects, a structure of the white balance control device of a different embodiment of the present invention comprises, light source selecting means for manually selecting light sources, white balance control means for controlling an amplification degree of a red elementary color signal and a blue elementary color signal out of red, green and blue elementary color signals, color matrixing means for outputting first and second color difference signals by processing white balance controlled elementary color signals by said white balance control means, and processing means for transmitting white balance control signals to the white balance control means, wherein the white balance control means is actuated in order to equalize integral averaged values of the first and second color difference signals and reference values and predetermined integral averaged values for each color difference signal are set as the reference values when an averaged color of all colors in a picture becomes an achromatic color at a reference color temperature, the processing means determining outputs of initial values of the white balance control signals and a variable region in order to control the values of the white balance control signals within the variable region.

In the present invention, values of white balance control signals are changed step by step when differences between integral averaged values of color difference signals and the reference values are more than the predetermined level value and a brightness value of an object is changed more than a predetermined level with a movable area of the values being restricted within the variable region.

In the present invention, values of white balance control signals are changed in order to equalize integral averaged values of color difference signals and the reference values when a difference between a present brightness value and a brightness value at the last converged time is more than a recognition level for changing brightness. In addition, (i) if a zooming position is in a telescope condition, the recognizing level for changing brightness is relatively high and if a zooming position is in a wide condition, the recognition level for changing brightness is relatively low, and (ii) if a brightness value of an object is high, the recognition level for changing brightness is relatively large and if the brightness value of an object is low, the recognition level for changing brightness is relatively low.

In the present invention, the values of the white balance control signals can be rapidly and accurately converged by controlling the outputting intervals of the white balance control signals. That is, if the outputting intervals become shorter, a converging time can be shortened. If the outputting intervals become longer, the values of the white balance control signals can be converged accurately.

The spectral characteristics of natural light and the spectral characteristics of artificial light are quite different from each other. Therefore, it is necessary to widen the controllable area in order to control white control corresponding to both kinds of light sources because color failure sometimes occurs. On the contrary, if the controllable area is narrowed in order to prevent color failure from occurring, it is insufficient to control white balance.

On the other hand, in the present invention, the controllable area is separated to an area for an outdoor mode and an area for an indoor mode so that white balance control is properly operated in both modes. Since the controllable area is restrictly specified, for example, even if green grass is photographed outdoors, white balance is controlled properly without over adjusting to have color failure occur. Switching the area of the outdoor mode and the area of the indoor mode is determined by the brightness value of an object and differences between the integral averaged values of color difference signals and the reference values, so that the switching is done accurately.

In the present invention, the amplification degree of the red signal and the blue signal does not have a fixed gain thereof. Values of white balance control signals are limited within some region and are changed in order to equalize the integral averaged values of the color difference signals and the reference value. Thereby, in a manual white balance method, even if there are differences between the predetermined color temperature of a selected light source and the actual color temperature of the selected light source, it is possible to prevent deterioration of reproduced colors without ignoring an operator's selection of a light source.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments for the present invention will be described with reference to drawings as follows.

Figure 1:
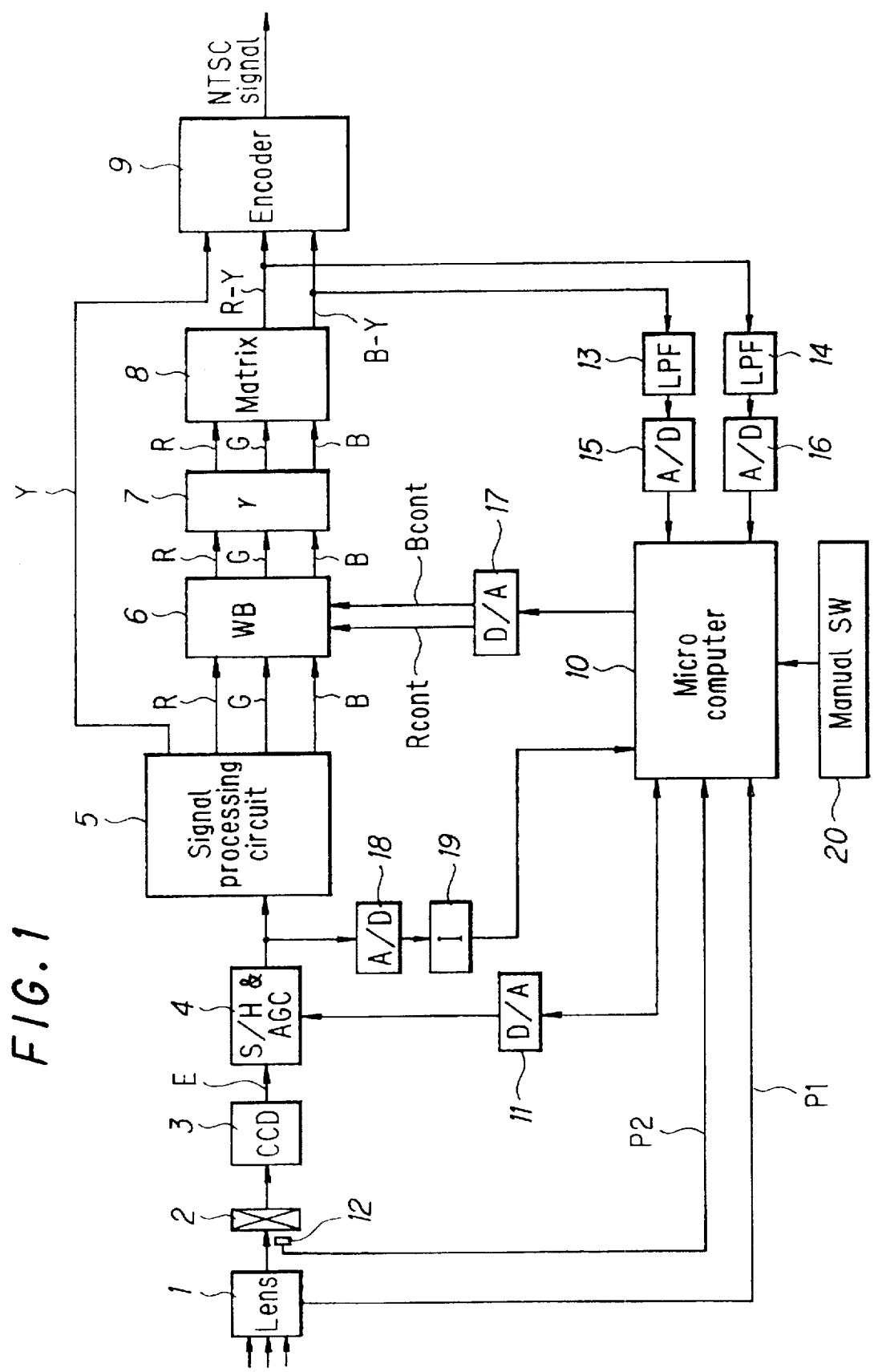
FIG. 1 shows a block diagram of a video camera according to an embodiment of the present invention.

FIG. 1 shows a block diagram of a video camera of the first embodiment of the present invention. Although each operation as claimed in the respective claims are different from each other, the structure of the video camera is common. The equipment structure will be explained first. As shown in FIG. 1, a picture image of an object is formed by a lens 1 and the picture image is input to a charge coupled device (CCD) 3 through an iris. Additive complementary color (cyanogen, magenta, yellow, green) filters are provided at an image pick up surface of the charge coupled device 3. A charge signal E indicates that the object is input to a signal processing circuit 5 through a sample hold (S/H) and automatic gain control (AGC) circuit 4. The signal processing circuit 5 outputs a brightness signal Y and elementary color signals R, G and B by processing the charge signal E. The elementary color signals R, G and B are white balance controlled in a white balance control device 6, γ-adjusted in a γ adjustment circuit 7 and input to a matrix circuit 8. In the matrix circuit 8, the elementary color signals R, G and B are matrix processed and the color difference signals are output. In an encoder 9, the color difference signals are orthogonally two phase modulated and the brightness signal Y is added to the signals and then the signal is output as a video signal by the NTSC method.

An output from the S/H and circuit 4 is digitally converted in an analog/digital (A/D) convertor 18, integrated in an integral circuit 19 and then input to a microcomputer 10. In the microcomputer 10, an AGC control signal is transmitted to the S/H and AGC circuit 4 through a digital/analog converter 11 based on an integrated value output from the S/H and AGC circuit 4. In the microcomputer 10, a zoom information P1 is transmitted from a lens driver and an iris data P2 for indicating an opening degree of an iris is transmitted from a hole element 12 for detecting an iris degree.

The microcomputer 10 computes a brightness of an object based on the opening degree of the iris 2, the gain and the electronic shutter speed from the S/H and AGC circuit 4. That is, the higher that the brightness of an object becomes, the narrower that an opening degree of the iris 2 becomes. On the other hand, the lower that the brightness of an object becomes, the wider that an opening degree of the iris 2 becomes. When the iris 2 is opened, the lower that the brightness of an object becomes, the greater that a gain of the S/H and AGC circuit 4 becomes. At that time, when the electronic shutter is actuated at high speed, the opening degree of the iris 2 and the gain information from the S/H and AGC circuit 4 becomes dark. The microcomputer 10 computes this information so that the brightness of the object can be detected.

On the other hand, the color difference signals R–Y and B–Y output from the matrix circuit 8 is averaged in low pass filters 13 and 14. The signals are converted to digital signals in analog/digital converters 15 and 16 and then output to the microcomputer 10, respectively. In the microcomputer 10, integral averaged values of the color difference signals R–Y and B–Y, which are computed in a condition that an averaged color of all colors at a reference color temperature, are designated as reference values, respectively.

A white balance control signal (Rcont) for a red signal, which equalizes the integral averaged value of the color difference signals R–Y and the reference value of the color difference signal R–Y, and a white balance control signal (Bcont) for a blue signal, which equalizes the integral averaged value of the color difference signal B–Y and the reference value of the color difference signal B–Y, are output from the microcomputer 10. The signals Rcont and Bcont are analog converted in a digital/analog converter 17 and then transmitted to the white balance control device 6. In the white balance control means 6, the gain of an elementary red color signal R and an elementary blue color signal B is controlled in accordance with the value of the white balance control signals Rcont and Bcont, respectively and a feed back control of the white balance is actuated. A timing and an area of the white balance control with respect to the white balance control signals Rcont and Bcont will be described.

Figure 2:
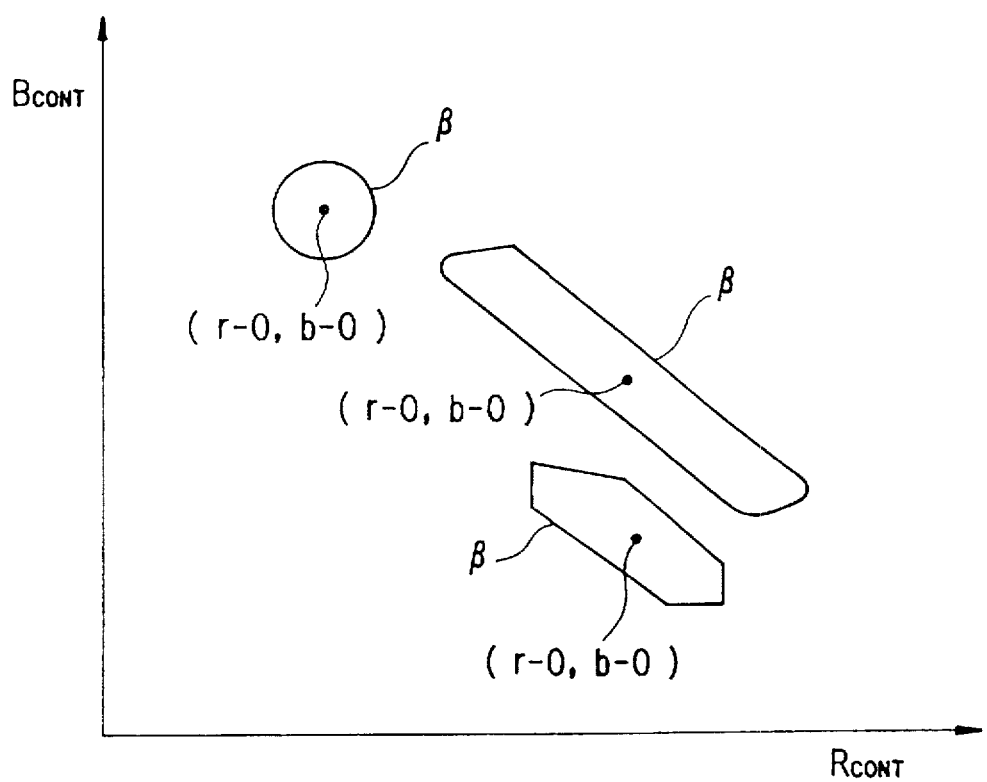
FIG. 2 shows initial values of white balance control signals and their variable region.

A device for manually selecting a light source with a switch 20 is connected to the microcomputer 10. The switch 20 can select three kinds of light source, that is, sunshine, electric bulb and fluorescent lamp. As shown in FIG. 2, in accordance with the selected light source, an initial value r–0 of a white balance control signal Rcont for a red color signal, an initial value b–0 of a white balance control signal Bcont for a blue color signal and a variable area β for these control signals Rcont and Bcont are preset in the microcomputer 10 corresponding to each kind of light source.

The first embodiment of the present invention will be described next with an explanation for the operation of the microcomputer 10. As shown by a flow chart in FIG. 3, a battery source is turned on in a step 1 and then an initial operation for white balance control is actuated in a step 2. As shown in FIG. 4, at first, a value r–0 as a white balance control signal Rcont for a red signal and a value b–0 as a white balance control signal Bcont for a blue signal are output from the microcomputer 10. The values r–0 and b–0 are preset values. Then, integral averaged values of white balance controlled color difference signals R–Y and B–Y, which correspond to the values r–0 and b–0 of the white balance control signals Rcont and Bcont, are input to the microcomuter 10 and the integral averaged values of the color difference signals and the reference values are compared. As a result of the comparison, if differences between the integral averaged values of the color difference signals and the reference values are more than predetermined values, the values of the white balance control signals Rcont and Bcont are stepped up or down and then output. The values of the white balance control signals Rcont and Bcont are successively stepped up or down and then output until the differences between the integral averaged values of the color difference signals and the reference values are less than the predetermined values. When the differences are less than the predetermined values (for example, 10 LSB [Least Significant Bit]), the values of white balance control signals Rcont and Bcont become constant, which is called "converging".

Figure 4:
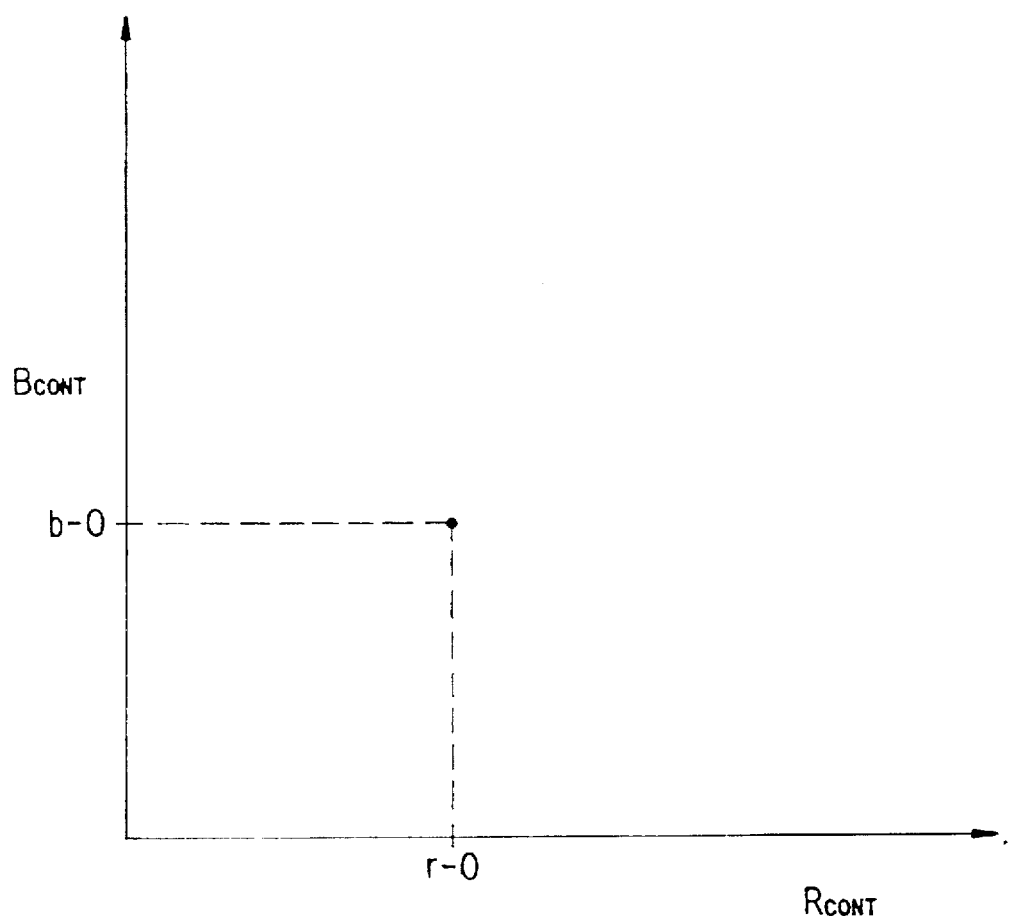
FIG. 4 shows values of white balance control signals at an initial photographing time.
Figure 5:
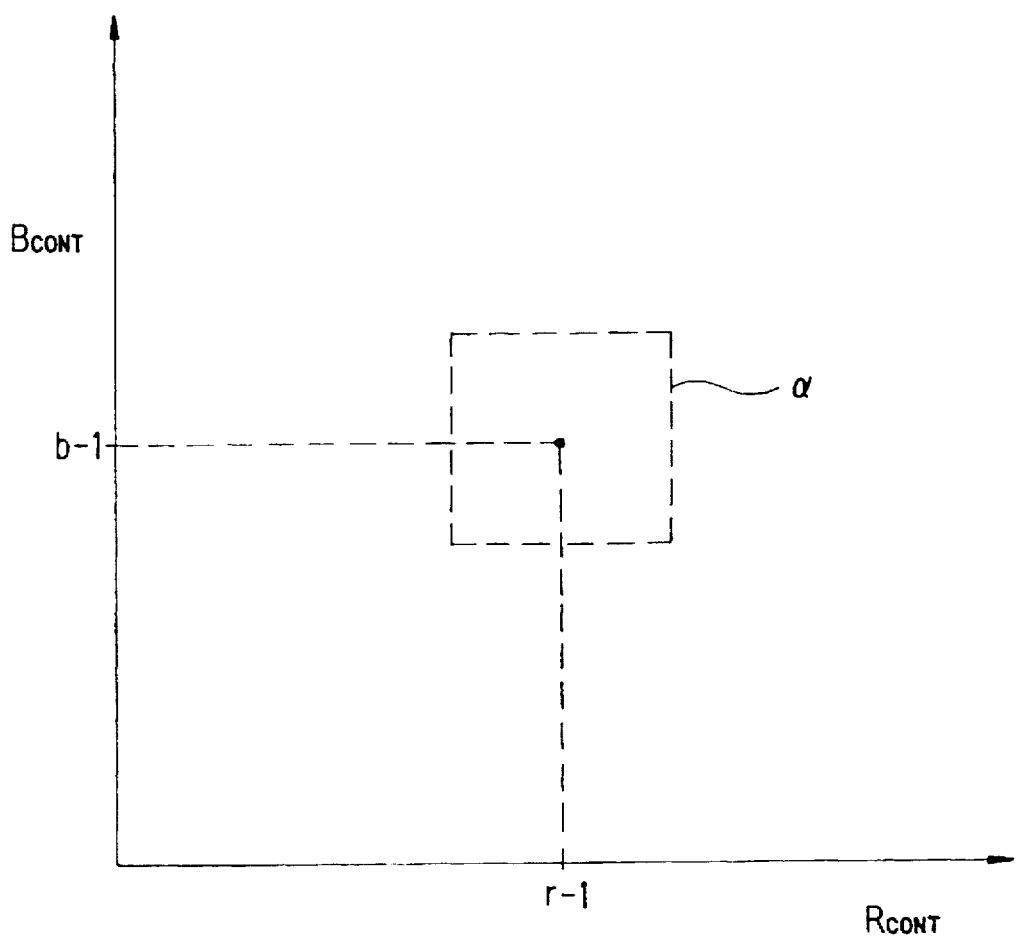
FIG. 5 shows white balance control signals and their variable region.

FIG. 5 shows step values r–1 and b–1 of the white balance control signals Rcont and Bcont, which are stepped up four times from the initial values r–0 and b–0 of the white balance control signals Rcont and Bcont as shown in FIG. 4.

Figure 6:
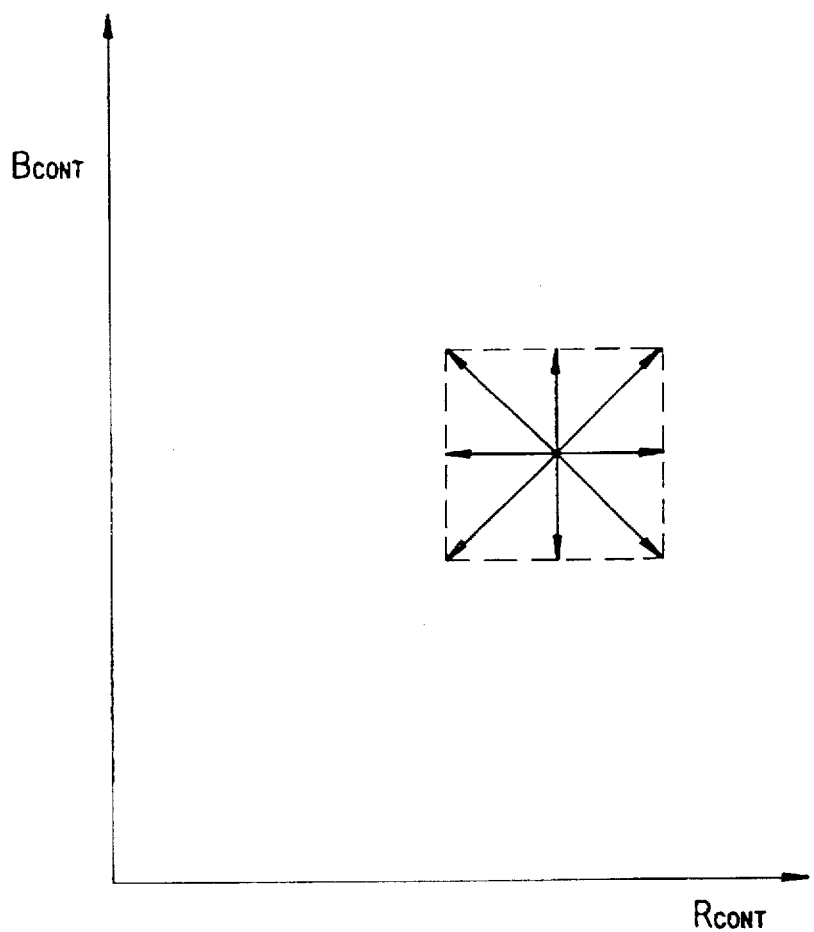
FIG. 6 shows a variation of white balance control signals.

The values of the white balance control signals Rcont and Bcont are increased or decreased step by step. Therefore, eight variations can be obtained by changing at least one of the values one step toward one of the bidirections as shown in FIG. 6.

Figure 3:
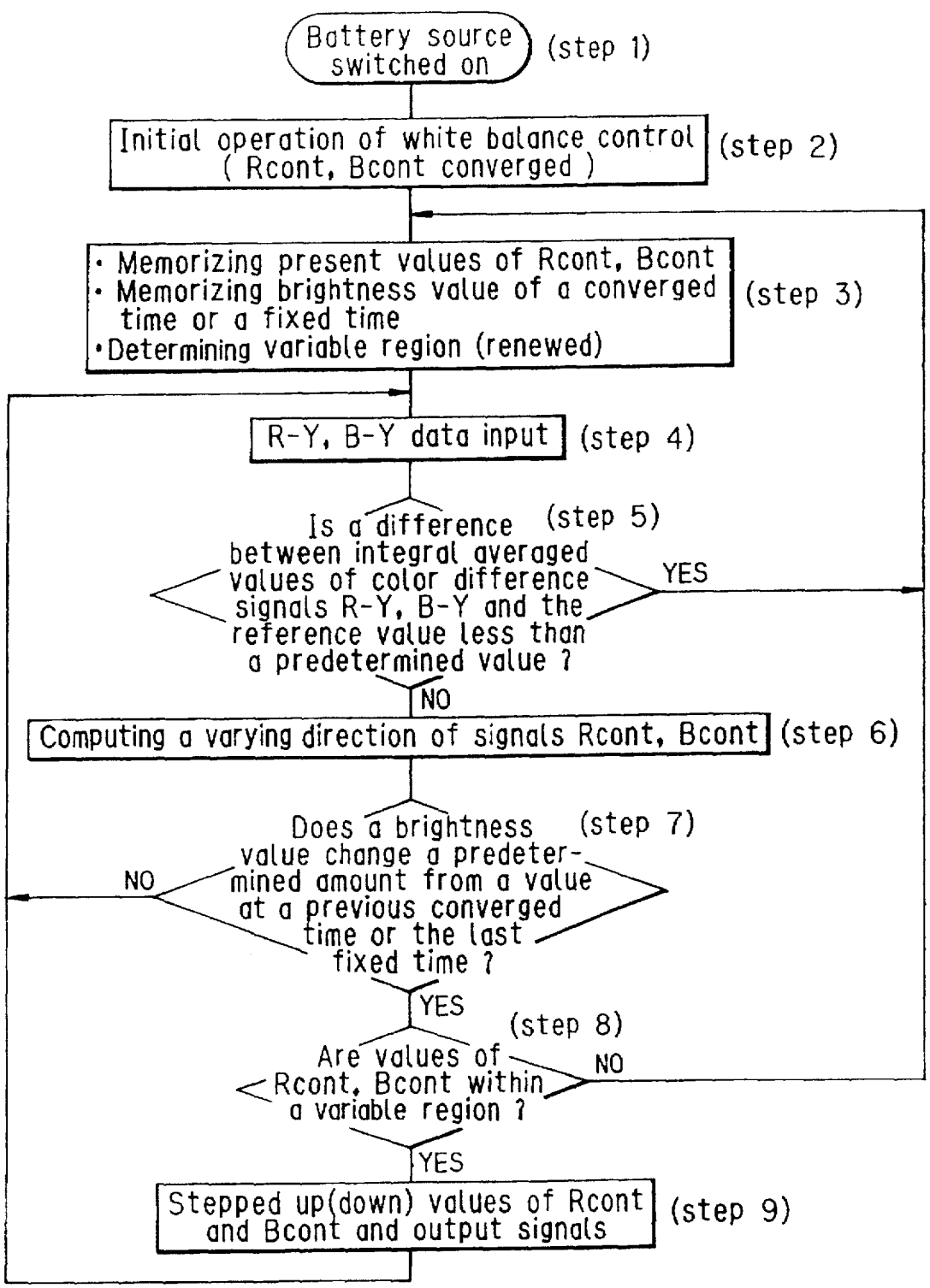
FIG. 3 shows a flow chart for the operation of a first embodiment according to the present invention.

Again as shown in FIG. 3, after the initial operation is finished, present values r–1 and b–1 (c.f. as shown in FIG. 5) of the white balance control signals Rcont and Bcont are memorized and a brightness value at a converged time is detected and then memorized in a step 3. Further, a variable region α as shown in FIG. 5 is determined. In this example, an upper boundary line and a lower line of the variable region α is determined by increasing or decreasing the converged value b–1 four steps, respectively. A right end boundary line and a left end boundary line of the variable region α is determined by increasing or decreasing the converged value r–1 four steps, respectively.

The integral averaged values of the color difference signals are input in a step 4. It is judged whether or not differences between the integral averaged values and the reference values are less than the predetermined value in a step 5. If the differences are more than the predetermined value, it means that the white balance, control is improper. Then, in a step 6, it is computed whether the values of the white balance control signals Rcont and Bcont should be increased or decreased in order to control white balance properly.

In a step 7, it is judged whether a displacement of the present brightness is more than the predetermined value (for example, 0.4 BV: Brightness Value) with respect to a previously memorized brightness value (memorized in the step 3). If a displacement amount is more than the predetermined value, it is considered that an object is changed and the operation goes to a step 8. One of the characteristics of the present embodiment is to detect whether an object is changed or not in response to a displacement of the brightness value of an object.

In the step 8, it is detected whether the present values of the white balance control signals Rcont and Bcont are within a predetermined variable region α. If the values are within the variable region α, the operation goes to a step 9. In the step 9, the values of the white balance control signals Rcont and Bcont, which are increased or decreased by one step, are output. In the step 6, it is already determined whether the values are increased or decreased.

Figure 7:
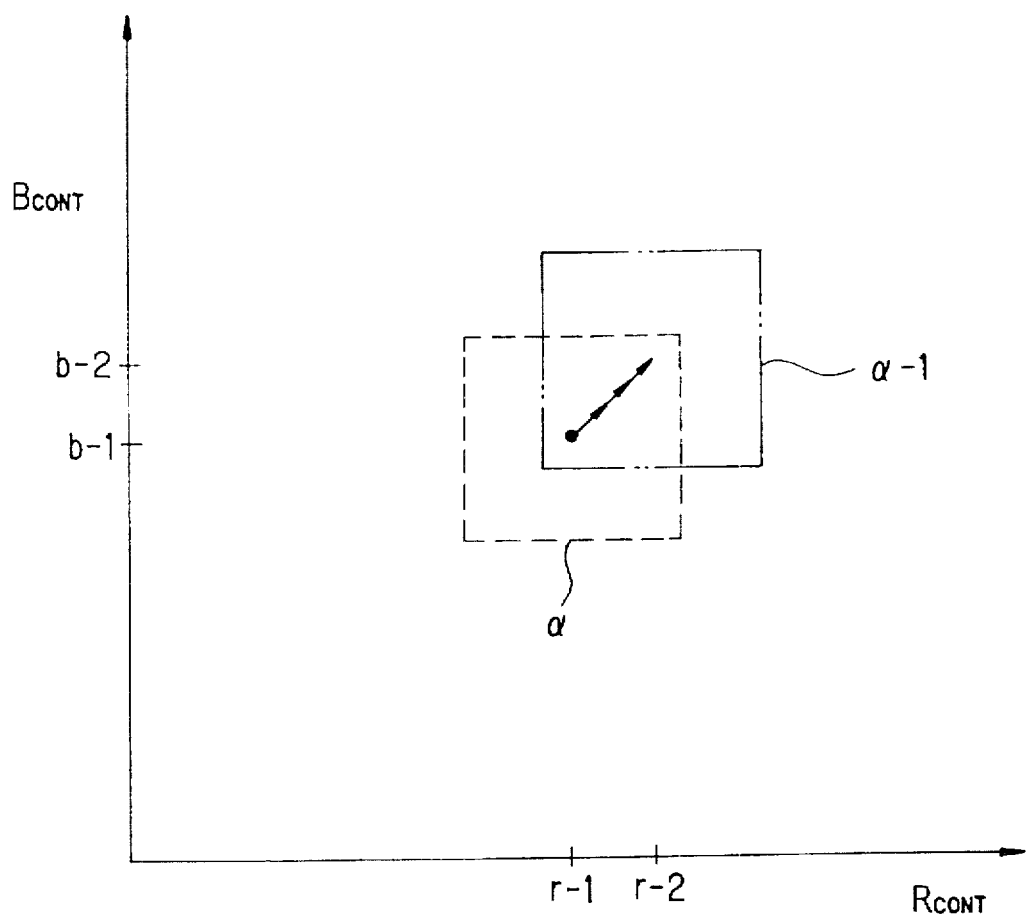
FIG. 7 shows variation of white balance control signals and its renewed condition of a variable region.

By repeating a control operation of the steps 4, 5, 6, 7, 8 and 9 in the flow chart, the values of the white balance control signals Rcont and Bcont are successively changed. FIG. 7 shows that the values of the white balance control signals Rcont and Bcont are successively stepped up three times and changed from the values r–1, b–1 to the values r–2, b–2 by repeating the operation control of the steps 4 through 9 in the flow chart.

On the other hand, for example as shown in FIG. 7, when the values of the white balance control signals Rcont and Bcont are converged at the values r–2 and b–2, that is, the difference is determined to be less than the predetermined value in the step 5 in the flow chart of the control operation as shown in FIG. 3, the operation returns to the step 3. In the step 3, the converged values r–2 and b–2 of the white balance control signals Rcont and Bcont are memorized and the brightness value at the time are memorized. Further, a new variable region α-1 is determined. An upper boundary line and a lower boundary line of the new variable region α-1 are determined by increasing and decreasing the converged step value b–2 by four steps, respectively. A right end boundary line and a left line boundary line of the new variable region α-1 are determined by increasing and decreasing the converged step value r–2 by four steps, respectively. Thus, a variable region is renewed from the region α to the region α-1.

Figure 8:
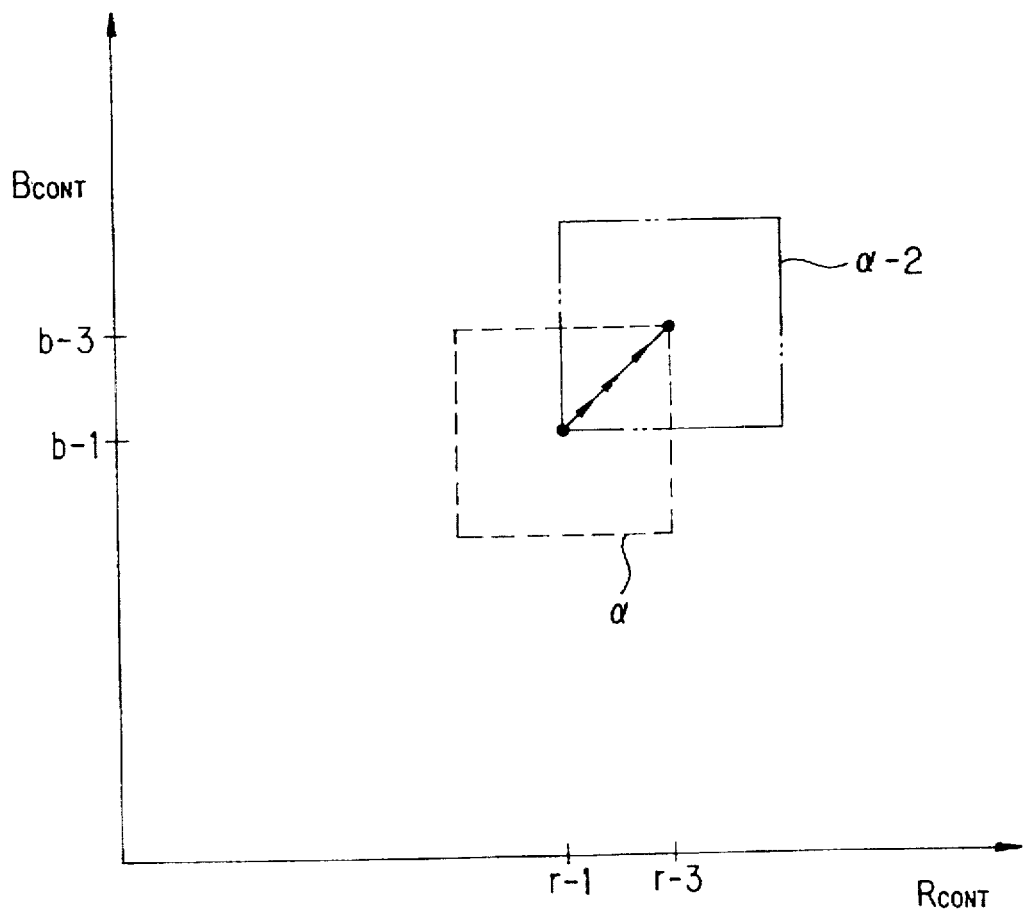
FIG. 8 shows a condition of converging the white balance control signals.

In the present embodiment, as shown in FIG. 8, when the values r–1 and b–1 of the white balance control signals Rcont and Bcont are changed to the values r–3 and b–3 by stepping up four times and the values r–3 and b–3 become border values of a variable area α, the values of the white balance control signals are fixed without varying, although a difference between integral averaged values of the color difference signals and the reference values are more than the predetermined values. In the flow chart as shown in FIG. 3, an operation does not go to the step 9 in the case when it is determined that the values of Rcont and Bcont are not within a variable region in the step 8. If the values of the white balance control signals become the boundary values of the variable area, the values of the white balance control signals are fixed although the differences between the integral averaged values of the color difference signals and the reference values are more than the predetermined values. It is a so called "fixing" that the values of the white balance control signals Rcont and Bcont are controlled not to be changed when the values become the boundary values. In case of the "fixing" and the "converging", the values of the white balance control signals are not changed. In the case of the fixing, the differences between the integral averaged values of the color difference signals and the reference values are more than the predetermined values.

In the case of the converging, the differences are less than the predetermined values.

If it is determined that the values of Rcont and Bcont are not within a variable region in the step 8 and the values of the white balance control signals Rcont and Bcont are fixed, the operation returns to the step 3. In the step 3, the fixed values (r–3, b–3 as shown in FIG. 8) of the white balance control signals Rcont and Bcont are memorized and the brightness value at the time is also memorized, and a new variable region α-2 having a horizontal width equalizing with + four step value and a vertical length equalizing with + four step value with respect to step values r–3 and b–3.

In an embodiment according to the present invention, a movable area of the values of the white balance control signals Rcont and Bcont is restricted and specified within the variable area. Even if a mono-colored object is suddenly photographed, the values of the white balance control signals Rcont and Bcont are not significantly changed. Therefore, an occurrence of color failure can be prevented. This feature is one of the most important characteristics of the present embodiment. A practical photographic action will be described as follows.

In the step 7 as shown in FIG. 3, if it is judged that brightness value is not changed by more than the predetermined value from the value at the previous converged time or the brightness value at the last fixed time, the operation returns to the step 4.

The practical photographic action with reference to the flow chart of the control operation as shown in FIG. 3 will be explained. For example, a beach side is photographed at first and then a bright blue ocean is photographed.

When turning on a battery switch at a beach side, the values of the white balance control signals Rcont and Bcont are converged by initially operating white balance control (steps 1 and 2). The converged values and the brightness at the beach side are memorized and then a variable region is specified.

Generally, the white balance control at the beach side is not significantly changed. When the operation goes to the step 5, the difference is determined to be less than the predetermined value. Therefore, the operation does not go to the step 9 and the values of the white balance control signals Rcont and Bcont are not changed. If a red swimming wear is photographed, the differences between the integral averaged values of the color difference signals and the reference values become large and the difference is determined to be greater than the predetermined value in the step 5. However, it is determined that the brightness value does not change by a predetermined amount in the step 7 in the case that a displacement of the brightness is less than the predetermined value as a result, the operation does not go to the step 9 so that the values of the white balance control signals Rcont and Bcont are not changed and color failure does not occur.

If a bright blue ocean is rapidly photographed for a whole scope of a picture, the differences between the integral averaged values of the color difference signals and the reference values become large and the difference is determined to be greater than the predetermined value in the step 5. If the brightness value of the ocean becomes much higher than the brightness value of the beach side and the brightness value is determined to change by a predetermined amount in the step 7, the step values of the white balance control signals Rcont and Bcont are stepped up (down) one time and output in the step 9. After repeating the steps 4 through 9 several times, the values of the white balance control signals Rcont and Bcont become boundary values and the values of Rcont and Bcont are determined to be outside of the variable region in the step 8, and the values of the white balance control signals Rcont and Bcont are fixed without going to the step 9.

As described above, although a difference between the integral averaged values of the color difference signals to be photographed for a blue ocean in a full scope of a picture and the reference values are large, the values of the white balance control signals Rcont and Bcont are fixed when the values become the boundary values of the variable region. Thus, even if a blue ocean is photographed, the values of the white balance control signals Rcont and Bcont are not significantly changed and color failure does not occur.

Unless the variable region is predetermined, the values of the white balance control signals Rcont and Bcont are changed by a large amount. Although an averaged color of all colors in a picture is blue, the averaged color is recognized as an achromatic color and the white balance control is operated so that a blue ocean becomes grey and color failure occurs.

A structure of the first embodiment of the present invention specifies a variable region so as to provide a limit of the displacement of the values of the white balance control signals Rcont and Bcont.

When an ocean is photographed, the fixed values of the white balance control signals Rcont and Bcont and the brightness of the ocean are memorized and then a new variable region is determined with respect to the memorized values (step 3). In the step 7, the brightness value is determined not to change by a predetermined amount, since the ocean brightness value at this time is the same as the ocean brightness value at the previous time. The operation does not go to the step 9 and the values of the white balance control signals Rcont and Bcont are not changed.

Next, the second embodiment according to the present invention will be described with respect to FIG. 9. In comparison with the first embodiment according to the present invention (as shown in FIG. 3), the steps of the second embodiment of the present invention are the same as the steps of the first embodiment of the present invention except for the addition of a step 2-1.

Figure 9:
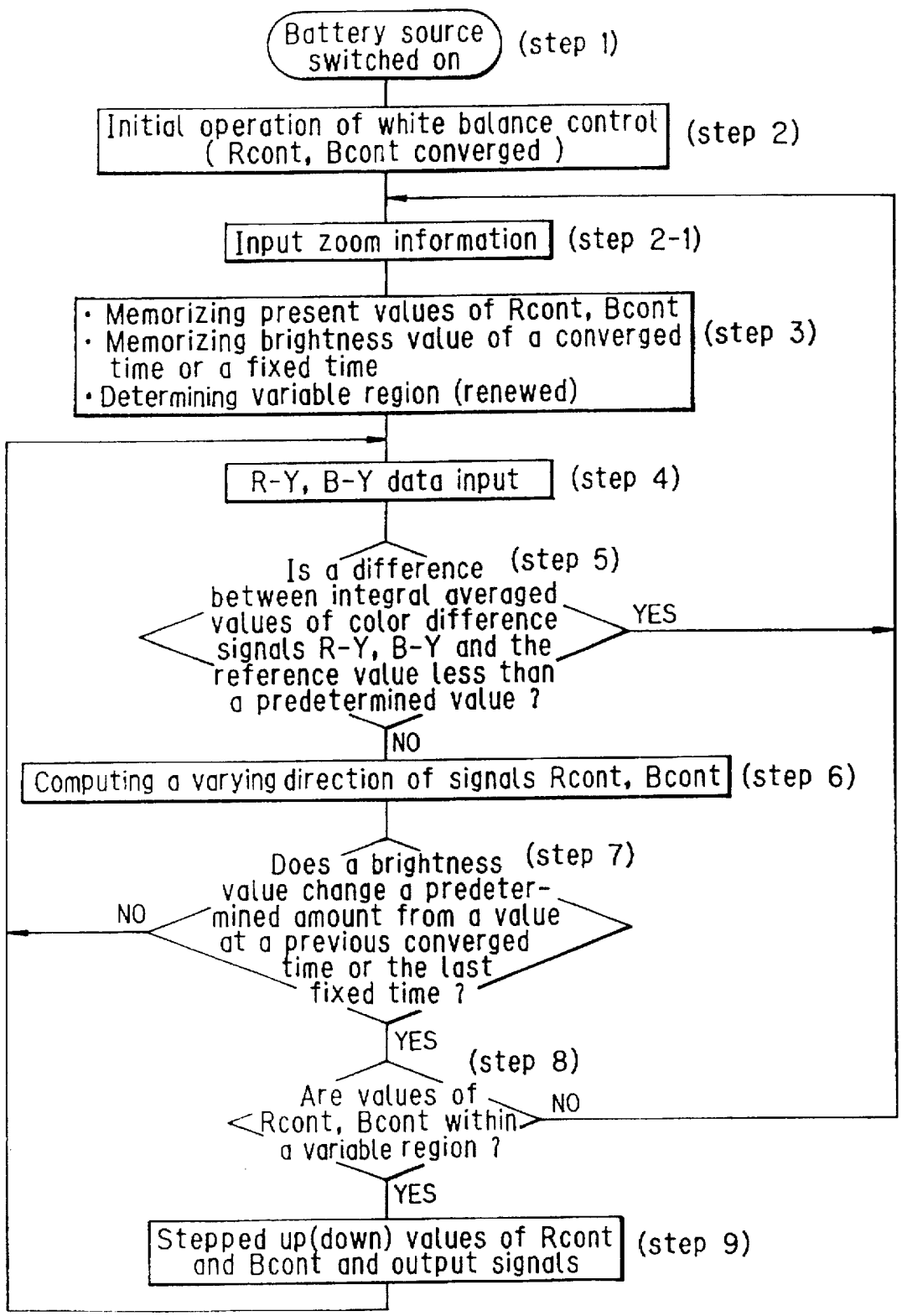
FIG. 9 shows a flow chart for the operation of a second embodiment of the present invention.

In the step 2-1 as shown in FIG. 9, zoom information P1 is input. When the camera is shifted to a telescope condition, an area of the variable region determined in the step 3 becomes narrow (for example, the width and the length of the variable region are + 2 step value). When the camera is shifted to a wide condition, an area of the variable region determined in the step 3 becomes normal space (for example, the width and the length of the variable region are + 4 step value).

A reason why the variable region becomes narrow in the telescope condition is as follows. When photographing in the telescope condition, a picture would be dominated by one object. If the color of the object is mono-color, it is recognized that a color temperature is changed and color failure occurs although the color temperature does not change. Therefore, the camera is shifted to a telescope condition, and displacement values of the white balance control signals are strictly specified by narrowing the variable region in order to prevent the color failure from occuring.

Next, the third embodiment according to the present invention along a description of an operation of the microcomputer 10 will be described. As shown in a flow chart in FIG. 10, a battery source is switched on in a step 101 and an initial operation of the white balance control is actuated in a step 102. The initial operation is the same as the step 2 shown in FIG. 3.

After finishing the initial operation, the operation goes to a step 103 and the zoom information is input. Next, in a step 104, the present values r–1 and b–1 (see an example as shown in FIG. 5) of the white balance control signals Rcont and Bcont are memorized simultaneously with memorizing the brightness value at a converging time. Further, as shown in FIG. 5, a variable region α is determined. A recognition level for changing the brightness value is specified corresponding to the zoom information.

The recognition level for changing brightness will be explained as follows.

(1) In the telescope condition, the recognition level for changing the brightness value is 0.8 Bv (Brightness value) with respect to a plus direction and 1.4 Bv with respect to a minus direction.

(2) In the wide condition, the recognition level for changing the brightness value is 0.4 Bv with respect to a plus direction and 0.8 Bv with respect to a minus direction.

The value of the recognition level for changing brightness increases slightly from the wide condition to the telescope condition.

In a step 105, the color difference signals are input and it is judged whether the differences between the integral averaged values of the color difference signals and the reference values are less than the predetermined values in a step 106. If the differences are more than the predetermined value, then the white balance is controlled improperly. Then, the operation goes to a step 107 and it is determined whether the values of the white balance control signals Rcont and Bcont should be increased or decreased in order to control white balance properly.

In a step 108, it is judged whether a difference between the present brightness value and the previous memorized brightness value (memorized in the step 104) is more than the recognition level for changing brightness detected in the step 104. If the difference is more than the recognition level for changing brightness, it is judged that an object is changed and an operation goes to a step 109.

If a following equation is assumed;

(present brightness)+(previous memorized value)−(brightness value)=d, (1) in the telescope condition, it is judged that an object is changed in the case that the difference d is more than 0.8 Bv or less than −1.4 Bv, and (2) in the wide condition, it is judged that an object is changed in the case that the difference d is more than 0.4 Bv or less than −0.8 Bv.

The technique according to the third embodiment of the present invention is on the premise that a change of an object is based detected by a displacement of the brightness value of the object.

In a step 109, it is judged that the present values of the white balance control signals Rcont and Bcont are within the variable region α determined in the step 104. If the present values are within the variable region α, the operation goes to a step 110. In the step 110, the values of the white balance control signals Rcont and Bcont are stepped up or down by one step and then output. The judgement of whether the values are increased or decreased is determined in the step 107.

While the control operation of the steps 105, 106, 107, 108, 109 and 110 of the flow chart are repeated, the values of the white balance control signals Rcont and Bcont are successively changed. As shown in FIG. 7, the values of the white balance control signal Rcont are stepped up three times and changed from the value r–1 to the value r–2 and the value of the white balance control signal Bcont is stepped up three times and changed from the value b–1 to the value b–2 by repeating the control operation of the steps 105 through 110 of the flow chart three times.

Figure 10:
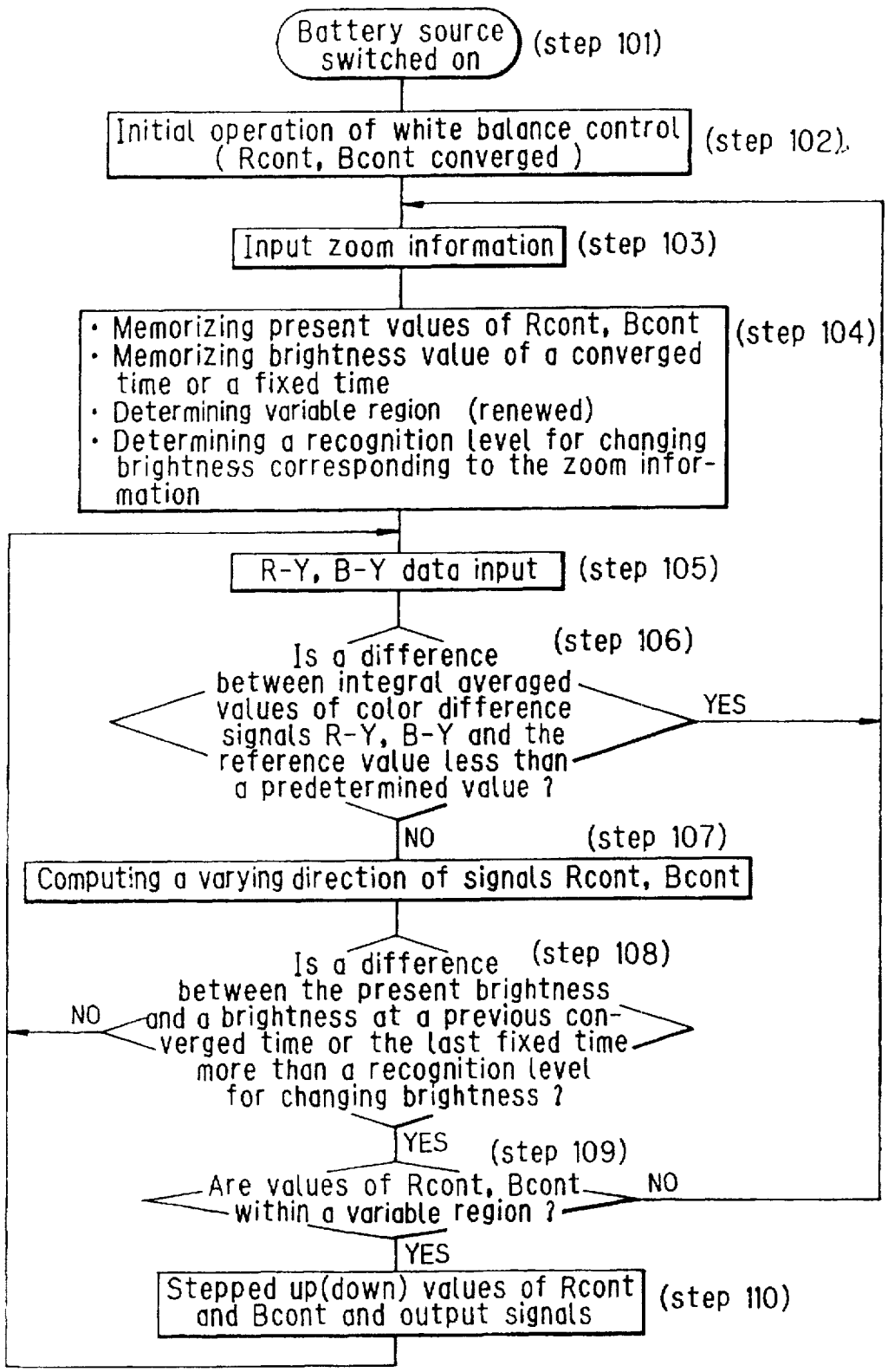
FIG. 10 shows a flow chart for the operation of a third embodiment of the present invention.

On the other hand, when the values of the white balance control signals Rcont and Bcont are converged to the values r–2, b–2, respectively, in FIG. 7, that is, the difference is determined to be less than a predetermined value in the step 106 in a flow chart as shown in FIG. 10, the operation returns to the steps 103 and 104 and the converged values of the white balance control signals Rcont and Bcont r–2, b–2 are memorized and the brightness value at the time is also memorized. Further, a new variable region α-1 having a ± four step horizontal width and a ± four step vertical length with respect to the step values r–2 and b–2 used as a central point. That is, the variable region is renewed from the region α to the region α-1. Further, the recognition level for changing, which corresponds to the zoom information, is set again.

Further, in the embodiment according to the present invention, as shown in FIG. 8, in the case that the values of the white balance control signals Rcont and Bcont are positioned in the variable region α, when the values are stepped up four times, changed from the values r–1 and b–1 to the values r–3 and b–3 and become boundary values of the variable region α, the values of the white balance control signals are fixed without changing, although the integral averaged values of the color difference signals and the reference value are more than the predetermined value. In the flow chart as shown in FIG. 10, the values of Rcont and Bcont are determined to be outside of the variable region in the step 109 so that an operation does not go to the step 110. As described above, when the values of the white balance control signals Rcont and Bcont become the boundary values of the variable region, the values are fixed, although the differences between the integral averaged values for color difference signals and the reference values are more than the predetermined values.

If the values of Rcont and Bcont are determined to be outside the variable region and the values of the white balance control signals Rcont and Bcont are fixed in the step 109, the operation goes back to the steps 103 and 104, the fixed values of the white balance control signals r–3 and b–3 (for example, in FIG. 8) are memorized and the brightness values at the time is also memorized. A new variable region α–2 is specified having a + four step horizonal width and a + four step vertical length with respect to the step values r–3 and b–3 as a central point of the variable region. The recognition level for changing brightness is set again.

As described above, in the embodiment according to the present invention, the area where the values of the white balance control signals Rcont and Bcont can be varied is limited within a variable region, so that the value s of the white balance control signals Rcont and Bcont cannot be significantly changed, even if a mono-colored object is suddenly photographed. Therefore, it is possible to prevent color failure from occurring.

In this embodiment according to the present invention, a recognition level for changing brightness is changed depending on the telescope condition and the the wide condition. When the camera is shifted to the telescope condition, the present brightness value is the brightness value at the last converged time and the values of the white balance control signals Rcont and Bcont are changed only when the brightness values are significantly changed. When the camera is shifted to the wide condition, the brightness value is changed when the present brightness value is changed by a small amount from the (fixed) value at the last converged time. The sensitivity for t he brightness value is changed corresponding to the telescope condition and the wide condition, which is one of the most important features of the present embodiment.

As described above, a reason why the recognition level for changing brightness becomes higher in the telescope condition in order to avoid a change of the values of the white balance control signals Rcont and Bcont will be described as follows. When an object is photographed in the telescope condition, a part of a picture may occassionally be dominated by one object. If a color of one object is monocolor, a recognition of changing the color temperature may be mistaken and color failure occurs, although the color temperature is not changed. Therefore, an object is determined to have changed only when the brightness value is significantly changed in the telescope condition. Thus, the values of the white balance control signals Rcont and Bcont are changed and a recognition of changing color temperature is prevented from being mistaken. In a view of a different point, a displacement of brightness value in a whole scope of a picture in the telescope condition is generally larger than the displacement of the brightness value in the wide condition. Therefore, in the telescope condition, the recognition level for changing the brightness value is made higher.

In the step 108 as shown in FIG. 10, it is judged that a brightness value is not changed more than a predetermined value from the brightness value at the last converged time or the previous fixed value and then the operation retunrs to the step 105.

Figure 11:
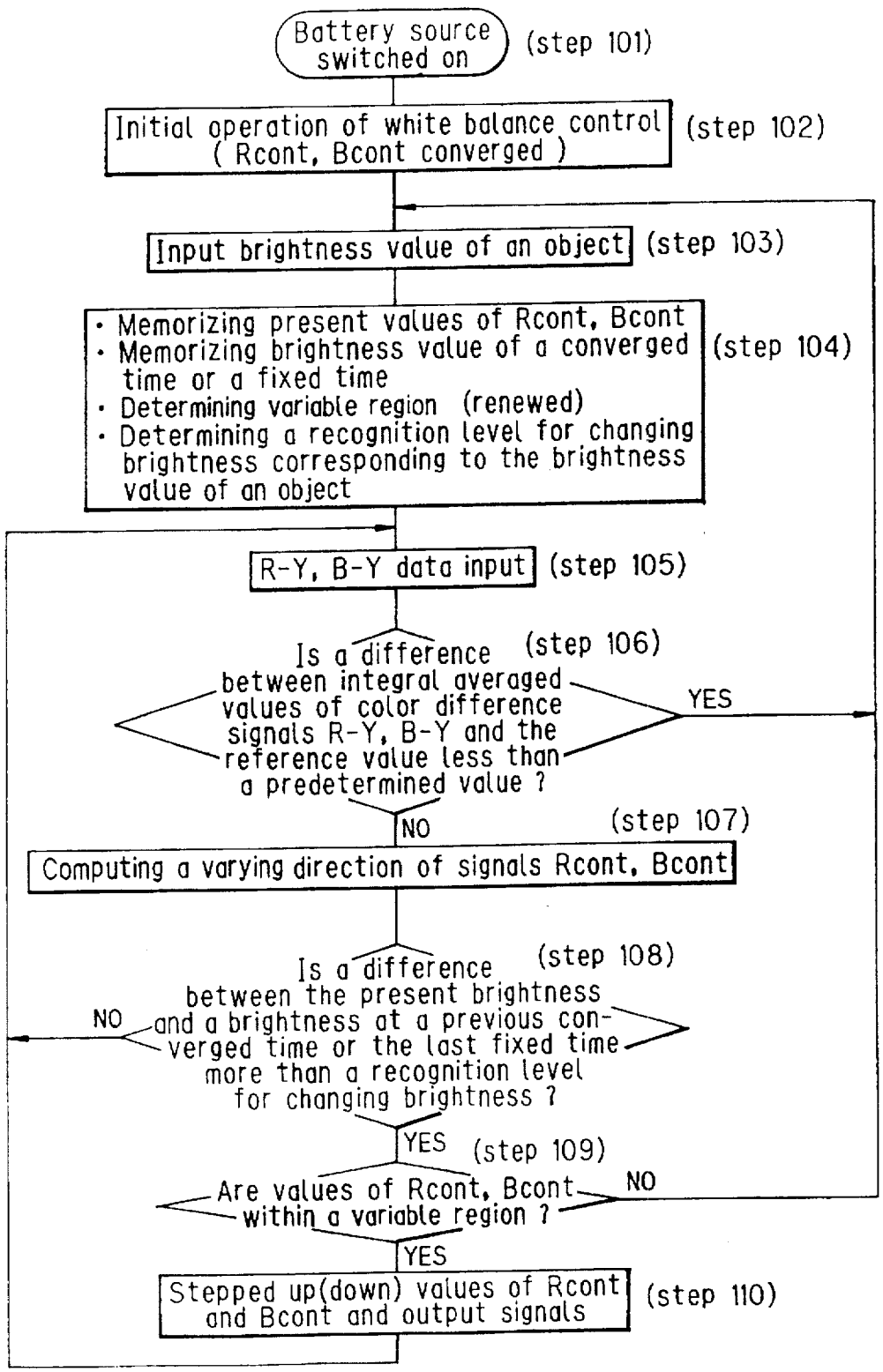
FIG. 11 shows a flow chart for the operation of a fourth embodiment of the present invention.

The fourth embodiment of the present invention will be explained next with reference to a flow chart as shown in FIG. 11. An operation of a flow chart as shown in FIG. 11 is the same as the operation control of the flow chart as shown in FIG. 10 except for the operation of steps 103 and 104. The differences of these steps will be described.

After a battery source is switched on and an initial operation of the white balance control is finished (steps 101, 102), a brightness data of an object is input in the step 103 and a recognition level for changing brightness corresponding to the brightness value of the object is specified in the step 104.

Figure 12:
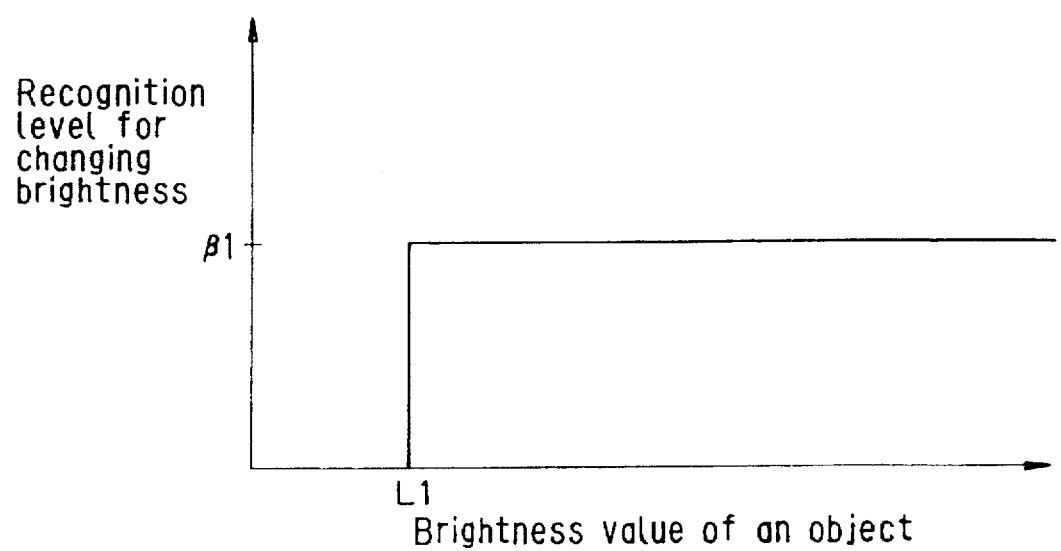
FIG. 12 shows a relation between the brightness value of an object and a recognize level for changing brightness.

FIG. 12 shows a relation between the brightness value of an object and a predetermined recognition level for changing brightness. As shown in FIG. 12, in the embodiment according to the present invention, if the brightness value of the object is more than L1, the recognition level for changing brightness is set as β1. If the brightness value of the object is less than L1, the recognition level for changing brightness is set as 0.

The recognition level for changing brightness is set as shown in FIG. 12, so that variations of changing the values of the white balance control signals Rcont and Bcont are divided to two variations on a border of the brightness value of the object L1 in the present embodiment.

(1) When the brightness value of the object is equal to or more than L1, a difference between integral averaged values of color difference signals and the reference values is more than the predetermined values and the white balance control is operated improperly (the decision is judged to be YES in the step 106). When a difference between the present brightness value and a brightness value at the previous converged time (or the last fixed brightness value) is more than β1 (the decision is judged to be YES in the step 108), the values of the white balance control signals Rcont and Bcont are changed by one step value and then output (step 110), while the values are in a variable region (the decision is judged to be YES in the step 109). As a result, if the brightness value is much more than the value L1, an object is recognized as being changed and the values of the white balance control signals Rcont and Bcont are changed on a premise that the other conditions are satisfied.

(2) On the other hand, when the brightness value of the object is less than L1, the decision is always judged to be YES in the step 108. If differences between integral averaged values of the color difference signals and the reference values are more than the predetermined values (the decision is judged to be NO in the step 106), and the values of the white balance control signals Rcont and Bcont are within a variable region (the decision is judged to be YES in the step 109), that is, if the two conditions are satisfied, the values of the white balance control signals Rcont and Bcont are changed. As a result, if the brightness value of the object is less than L1, the values of the white balance control signals Rcont and Bcont are changed on a premise that the above described two conditions are satisfied (steps 106, 109) and the detection of a change of the brightness value of an object is stopped because a photographic circumstance is dark and it becomes difficult to detect a change of the brightness value of an object. Accordingly, even if the photographic circumstance is dark, white balance control is always operated properly.

Figure 13:
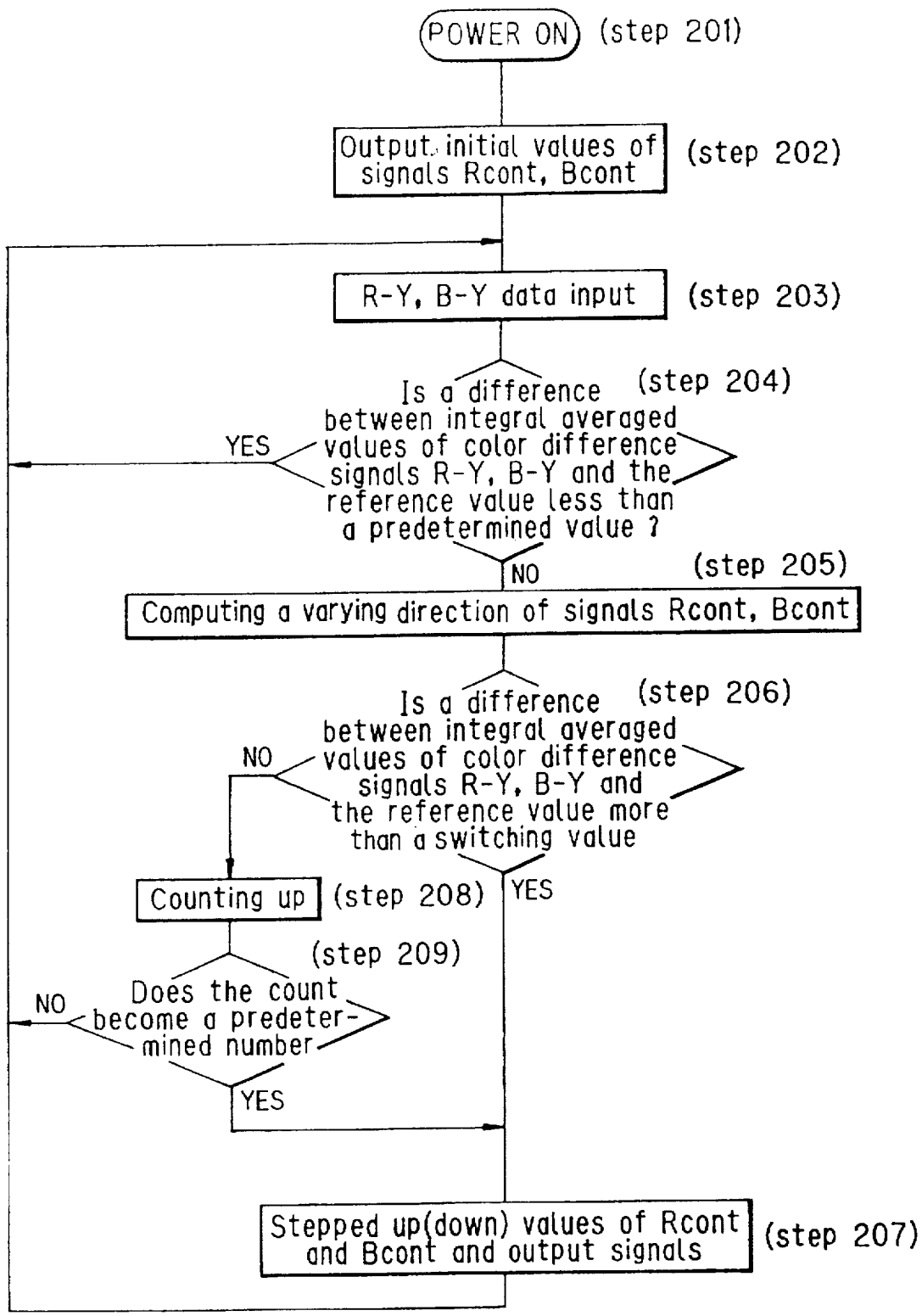
FIG. 13 shows a flow chart for the operation of a fifth embodiment of the present invention.

A control operation of the fifth embodiment will be explained next according to the present invention with reference to FIG. 13. A battery source is switched on in a step 201, and a value of the white balance control signal for a red signal as an initial value and a value of a white balance control signal for a blue signal as an initial value are output from the microcomputer 10. Accordingly, the initial values are preset. Next, the microcomputer 10 inputs integral averaged values for color difference signals which are white balance controlled depending on the values of the white balance control signals Rcont and Bcont as the initial values in a step 203. In a step 204, it is judged whether differences between the integral averaged values of the color difference signals and the reference values are more than the predetermined values (for example, 10 LSB [Least Significant Bit]). If the judgement is NO, it is recognized that the values are not converged and the operation goes to a step 205. In the step 205, it is computed whether the values of the white balance control signals Rcont and Bcont should be increased or decreased in order to control white balance.

In a step 206, it is judged whether the differences between integral averaged values of the color difference signals and the reference values are more than switching values. The switching values are more than the predetermined values determined in the step 204. If the differences between the integral averaged values and the reference values are more than switching values, the operation goes to a step 207 and the values stepped up (down) once of the white balance control signals Rcont and Bcont are output because the values of the white balance control signals Rcont and Bcont are quite different from the converged values.

When the values of the white balance control signals Rcont and Bcont are different from the converged values and the difference between the integral averaged values of the color difference signals and the reference values are more than the switching values, the steps 203 through 207 of the control operation are repeated and values of the white balance control signals Rcont and Bcont renewed at intervals of 0.5 second are output. Thus, the values of the white balance control signals Rcont and Bcont are renewed by intervals of a short period and then output, so that the values will quickly converge.

As the value of the white balance control signals Rcont and Bcont approach the converged values and the differences between the integral averaged values of the color difference signals and the reference values become less than the switching value (the decision is judged to be NO in a step 206), the number of the cases is counted up in a step 208. Unless the number of the cases that the difference is less than the switching value becomes a predetermined number of times (for example, four times), the operation goes to a step 207 and the values of the white balance control signals stepped up (down) by one time value are output and the counted times are reset.

As a result, when the values of the white balance control signals Rcont and Bcont approach the converged values, the output of the white balance control signals Rcont and Bcont are thinned out and output intervals become longer. Thus, the values can be converged accurately without the occurrence of any hunting.

If the differences between the integral averaged values of color difference signals and the reference values are more than the predetermined values, that is, if the decision is judged to be YES in the step 204, the operation returns to the step 203. In this case, the values of the white balance control signals Rcont and Bcont are renewed.

The sixth embodiment of the present invention will be explained next. In the present embodiment, after the values are converged once, a converging speed becomes late by making the intervals for outputting the white balance control signals Rcont and Bcont longer.

Figure 14:
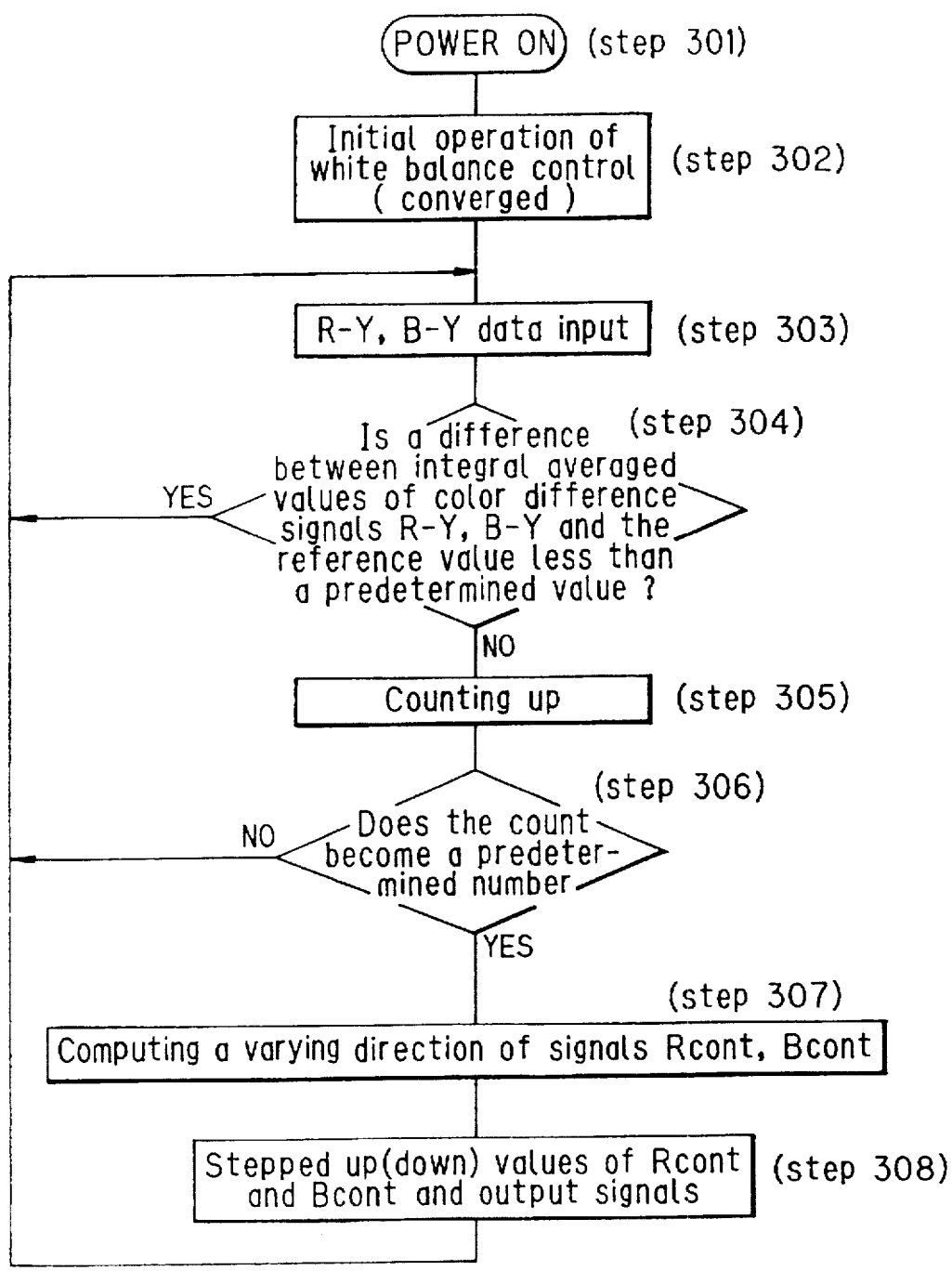
FIG. 14 shows a flow chart for the operation of a sixth embodiment of the present invention.

A control operation of the sixth embodiment of the present invention will be explained with reference to FIG. 14. When a battery source is switched on in a step 301, an initial operation of white balance control is actuated in a step 302. At first, the microcomputer 10 outputs a value of a white balance control signal for a red signal Rcont as an initial value and a value of a white balance control for a blue signal as an initial value so that the initial values are preset. Next, the microcomputer 10 inputs integral averaged values of color difference signals white balance controlled corresponding to the white balance control signals Rcont and Bcont as the initial values, respectively and these values are compared with the integral averaged values of the color difference signals and the reference values. Upon comparing the values, if the differences between the integral averaged values of the color difference signals and the reference values are more than the predetermined values, the values of the white balance control signals Rcont and Bcont stepped up (down) by one step value (increased or decreased) are output. If the differences between the integral values of the color difference signals and the reference values are less than the predetermined values (for example, 10 LSB [Least Significant Bit]), the values of the white balance control signals Rcont and Bcont become constant.

In the initial operation as described above, in the case that intervals for outputting the white balance control signals Rcont and Bcont are fixed at 0.5 second, the intervals may become shorter when the values are much different from the converged value and the intervals may become longer when the values become the same as the converged values.

After the values converge once, the integral averaged values of the color difference signals during a photographing period are input in a step 303. In a step 304, it is Judged whether the difference between the integral averaged values of the color difference signals and the reference values are less than the predetermined values. If the decision is judged to be YES, the white balance is controlled properly, the operation returns to the step 303 and the present values of the white balance control signals are maintained. If the decision is judged to be NO, the white balance is controlled improperly, and the operation goes to a step 205. In the step 305, a number of cases that the difference of the integral averaged values and the reference values are more than the predetermined value is counted.

In a step 306, it is judged whether the counted number approaches the predetermined count number (for example, four times). If the decision is judged to be NO, the operation returns to the step 303 and the present values of the white balance control signals are maintained. If the decision is judged to be YES, varying directions of the value of the white balance control signals Rcont and Bcont are computed in a step 307 and the value stepped up (down) by one step value of the white balance control signals Rcont and Bcont are output in the step 308.

Until the detecting number of the changed color temperatures becomes the count number, the values of the white balance control signals Rcont and Bcont are not renewed. Accordingly, even if a mono-colored object is photographed in a full scope of a picture, the values of the white balance control signals Rcont and Bcont are not changed and a proper white balance control can be maintained.

When the color temperatures are changed during a photographing period, the values of the white balance control are renewed only for a few number of times. That is, after the values converge in the initial condition once, it is seldom that the color temperatures change suddenly. Thereby, the object can be photographed while the values of the white balance control are slightly changed. An occurrence of color failure which happens in the case that a mono-colored object is photographed can be prevented as much as possible unless one object is photographed for a long time.

Figure 15:
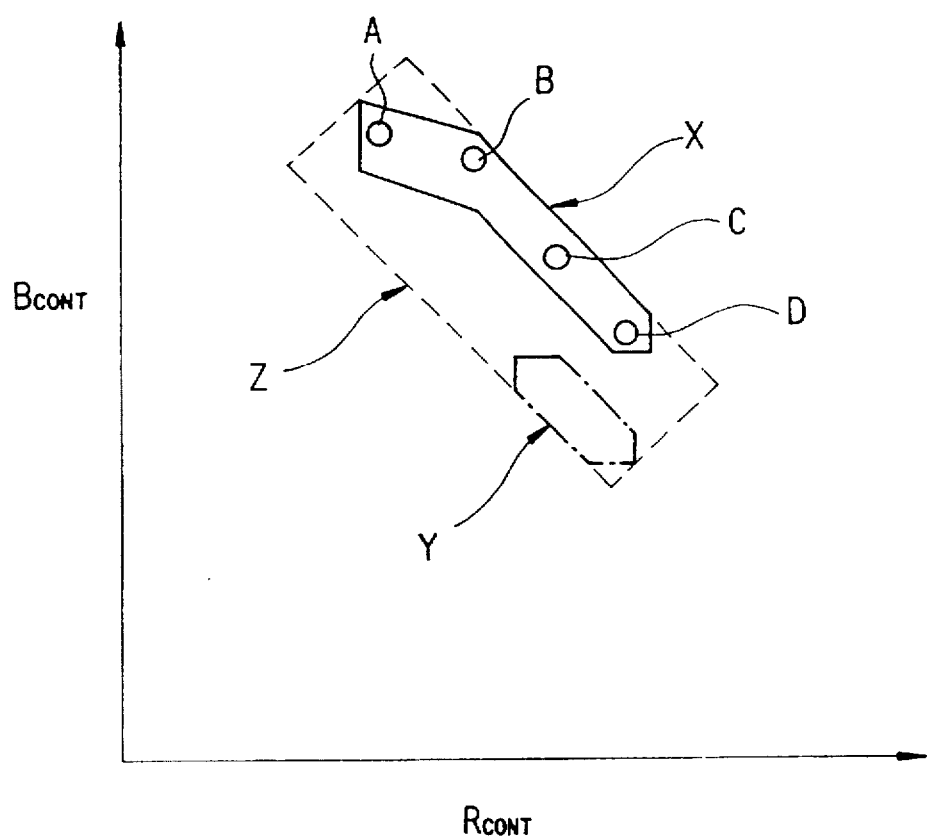
FIG. 15 shows a control region of a control device.

Next, the seventh embodiment of the present invention will be described. In the seventh embodiment, an indoor mode and an outdoor mode are set in a microcomputer 10 as shown in FIG. 15. In the indoor mode, the values of the white balance control signals Rcont and Bcont are positioned within a region X surrounded with a real line in FIG. 15. When a white paper is photographed under an electric bulb, a cool white fluorescent lamp, a natural fluorescent lamp, and a day light fluorescent lamp, values of the white balance control signals Rcont and Bcont are positioned at points A, B, C, and D, respectively as shown in FIG. 15. In the region X of the indoor mode, each of the converged values of the white balance control signals photographed on a white paper under a respective artificial light are included and the region X becomes narrow. On the other hand, in the outdoor mode, the values of the white balance control signals Rcont and Bcont are positioned within a region Y surrounded with a long and short dotted line in FIG. 15.

The microcomuter 10 detects brightness values of an object by judging from an iris data P8 and judges the outdoor mode if the detected brightness value is more than a mode switching value and the indoor mode if the detected brightness value is less than the mode switching value. As shown in Table 1, the fact that an outdoor brightness value is generally more bright than an indoor brightness is used. unit

TABLE 1

| unit (lux) | |
|---|---|
| | snow mountain |
| | sky slope |
| | beach side, fine day in summer |
| 100,000 | sunshine, fine day in the afternoon |
| (100,000) | |
| | sunshine, fine day at three o'clock |
| (35,000) | |
| | sunshine, cloudy (32,000) |
| 10,000 | |
| | sunshine, cloudy, one hour after sunrise (2,000) |
| 1,000 | window side at the office under fluorescent lamp (1,000) |
| | sunshine, fine day, one hour after sunset (1,000) |
| | shopping space in department store (500–700) |
| 500 | ticket gate at station (650) |
| | office under fluorescent lamp (400–500) |
| | eight mat space under two fluorescent (30 W) lamp (300)) |
| 300 | subway platform (300) |
| | arcade in the night (150–200) |
| 100 | |
| | movie theater, intermisson time (15–35) |
| | candle light (10–15) |
| 10 | |

In the microcomputer 10, white balance is controlled as follows. The microcomputer 10 increases (decreases) the values of the white balance control signals Rcont and Bcont step by step in order to make the difference between the integral averaged value of the color difference signals R–Y and B–Y and the reference values less than a value for judging convergence (for example, 10 LSB [east Significant Bit]). When the differences between the integral averaged values of the color difference signals and the reference values are less than the values for judging convergence for operating white balance control signals at the most suitable color temperature, the values of the white balance control signals Rcont and Bcont become constant.

In the outdoor mode, the values of the white balance control signals are positioned within the region Y. In the indoor mode, the values of the white balance control signals are positioned within the region X. If the values of the white balance control signals Rcont and Bcont are converged to constant values within the region X, white balance control is properly operated.

In addition, when white balance is automatically controlled and an occurrence of color failure is reduced regardless of natural light and artificial light in the outdoor and indoor modes, a controlled region of the white balance control signals Rcont and Bcont is widened as shown by a region X surrounded with a broken line in FIG. 15. To widen the controlled region, an occurrence of color failure is increased, since the other factors, except for the information of color temperature, effect the white balance control. The seventh embodiment of the present invention provides the outdoor mode and the indoor mode. In the outdoor mode, white balance is controlled within a region corresponding to a respective value of color temperature under natural light. In the indoor mode, white balance is controlled, within a region corresponding to a respective value of color temperature under artifical light. Therefore, the region of the white balance control is restrictively limited. Even if green grass and a red wall is photographed of which the averaged color of all colors in a picture is not an achromatic color, an occurrence of color failure is remarkably reduced and white balance is controlled properly.

In the seventh embodiment of the present invnetion, after the values of the white balance control signals Rcont and Bcont are converged to values within the region Y, the values of the white balance control signals Rcont and Bcont are shifted to the region X in the indoor mode, only when the following two conditions are satisfied.

(1) The brightness values of the object are less than a value for the switching modes.

(2) The difference between integral averaged values for color difference signals R–Y and B–Y and the reference values is more than the widened converged value for judging (for example, 30 LSB), where the widened converged value for judging (30 LSB) is slightly greater than the converged value for judging (10 LSB).

When an object is photographed outdoors, even if the above condition (1) is satisfied by photographing a dark object, the values of the white balance control signals Rcont and Bcont are not shifted to the region X in the indoor mode because the condition (2) is not satisfied. Thus, when a dark object is photographed outdoors, the white balance is properly controlled by the values of the white balance control signals within the region Y for the outdoor mode so that the object is photographed properly. If a region is changed by only having condition (1) satisfied, when a dark object is photographed outdoors, the values of the white balance control signals are shifted to the region X for the outdoor mode, so that the white balance cannot be controlled properly. On the other hand, when a person who is photographing outdoors enters into a house with a camera, the above conditions (1) and (2) are satisfied, so that the values of the white balance control signals Rcont and Bcont are shifted to the region X for the indoor mode and white balance is properly controlled indoors.

In the seventh embodiment of the present invention, after the values of the white balance control signals Rcont and Bcont are converged at the values within the region X for the indoor mode, the values of the white balance control signals Rcont and Bcont are shifted to the values within the region Y for the outdoor mode, only when the following conditions are satisfied.

(3) The brightness values of an object are greater than a value for the switching modes (4) The difference between integral averaged values f or color difference signals R–Y and B–Y and the reference values is more than the widened converged value for judging (for example, 30 LSB) where the widened converged value for judging (30 LSB) is slightly greater than the converged value for judging (10 LSB).

When an object is photographed indoors, even if the above condition (3) is satisfied by photographing with a light source such as an electric bulb, the values of the white balance control signals Rcont and Bcont are not shifted to the region Y in the indoor mode, since the condition (4) is not satisfied. Thus, when a light source such as an electric bulb is used for photographing indoors, the white balance is properly controlled by the values of the white balance control signals within the region X for the indoor mode so that the object is photographed properly.

If a region is changed by only having condition (3) satisfied, when a light source such as an electric bulb is used for photographing indoors, the values of the white balance control signals are shifted to the region Y for the indoor mode, so that the white balance cannot be controlled properly. On the other hand, when a person who is photographing indoors goes outdoors with a camera, the above conditions (3) and (4) are satisfied, so that the values of the white balance control signals Rcont and Bcont are shifted to the region Y for the indoor mode and white balance is properly controlled outdoors.

When the values are shifted from the region X to the region Y, the values change to values located in the region Y nearest to the region X. Similarly, when the values are shifted from the region Y to the region X, the values change to converged values located in the region X nearest to the region Y.

In the present embodiment, the indoor and outdoor modes are changed depending on a brightness value for switching, that is, a value for switching modes may be selected for the most suitable value in accordance with the type of video camera. The regions X and Y may be optionally selected in accordance with a design of a video camera.

Figure 16:
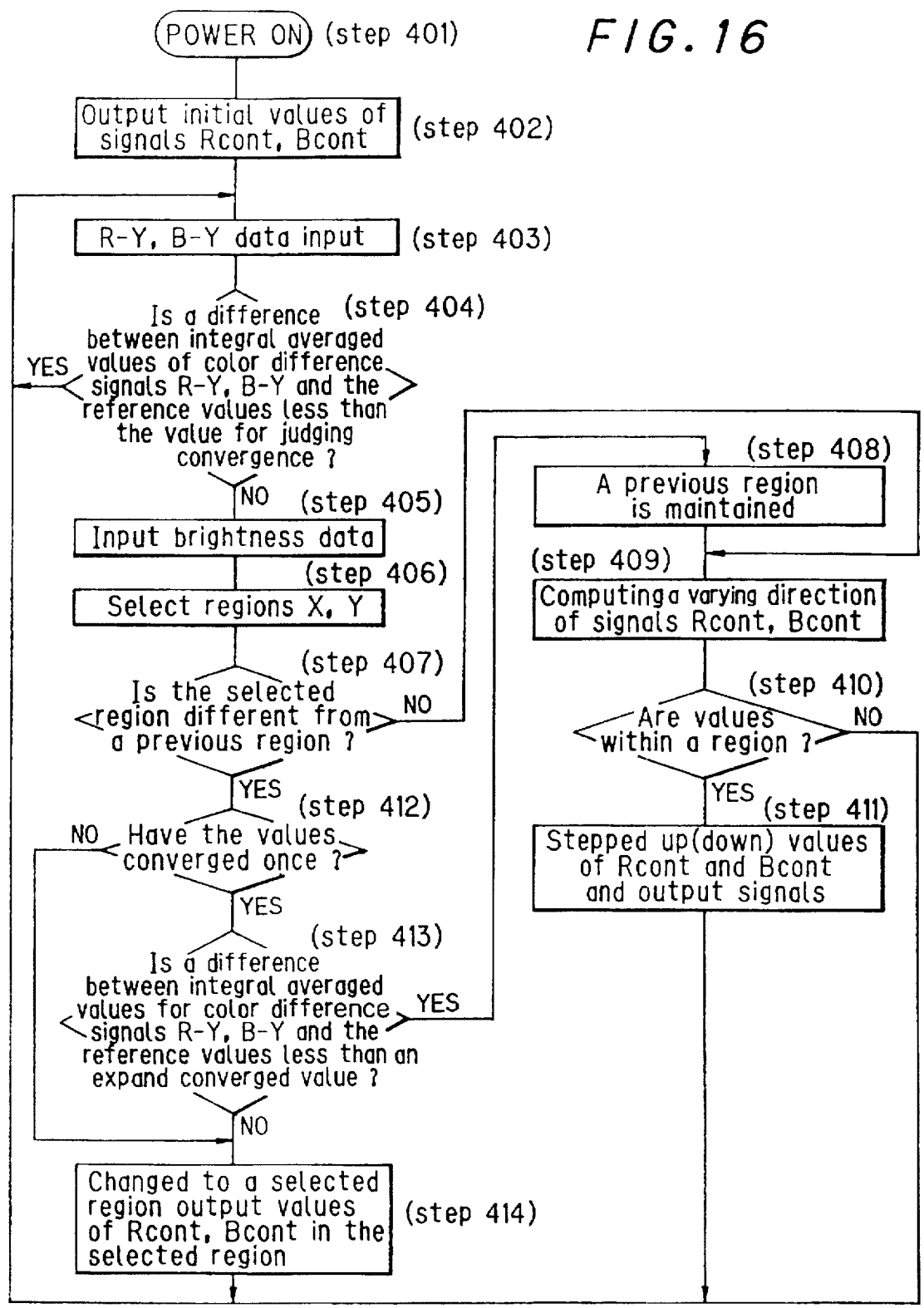
FIG. 16 shows a flow chart for the operation of a seventh embodiment of the present invention.

Next, a control operation of the seventh embodiment will be explained according to the present invention with reference to FIG. 16. A battery source is switched on in a step 401, a value of the white balance control signal for a red signal as an initial value and a value of a white balance control signal for a blue signal as an initial value are output from the microcomputer 10 so that the initial values are preset. Next, the microcomputer 10 inputs integral averaged values for color difference signals R–Y and B–Y which are white balance controlled depending on the values of the white balance control signals Rcont and Bcont as the initial values in a step 403. In a step 404, it is judged whether a difference between the integral averaged values of the color difference signals R–Y and B–Y and the reference values are more than the predetermined values (for example, 10 LSB [Least Significant Bit]). If the judgement is YES, the values converge and the operation returns to the step 403. If the judgement is NO, the values do not converge and the operation goes to a step 405.

In the step 405, brightness values are detected by inputing brightness data. In a step 406, if the brightness value of an object is more than a value for the switching mode, the region Y is selected for the outdoor mode and if the brightness value of an object is less than a value for the switching mode, the region X is selected for the indoor mode. In a step 407, it is judged whether a selected region is different from a previous region. If the selected region is the same as the previous region, the operation returns to a step 409.

In a step 408, a region is selected which is the same as the previous region and a varying direction of the white balance control is computed in a step 409. If the values of the white balance control signals Rcont and Bcont are within the region (the decision is to be judged YES in a step 410), the white balance control signals Rcont and Bcont are output of which the values are changed by one step value. If the values of the white balance control signals Rcont and Bcont are not within the region (the decision is judged to be NO in the step 410), renewed values of the white balance control signals Rcont and Bcont are not output.

If it is judged that the selected region is different from the previous region in the step 407, it is judged whether the values converge once in a step 412. After the values converge once (the decision is judged to be YES in the step 412), when a difference between integral values of the color difference signals R–Y and B–Y and the reference values are more than enlarged converged values, the operation goes to the step 408. Therein, the selected region is not utilized and the previous region is still utilized. Such an operation is operated when a light source is photographed indoors and a dark object is photographed outdoors.

When the decision is judged to be NO in a step 412 or the values of the white balance control signals Rcont and Bcont are converged once (the decision is judged to be YES in the step 412) and a difference between integral averaged values of color difference signals R–Y and B–Y and the reference values are more than enlarged converged values, the operation goes to a step 414. In the step 414, a region is changed to the region which is selected in the step 406, and the white balance control signals of which the values are positioned in the selected region are output. Such an operation is operated when a person who is photographing indoors goes outdoors or a person who is photographing outdoors goes indoors.

Next, the eighth embodiment of the present invention will be described with an explanation of an operation of the microcomputer 10. As shown by a flow chart in FIG. 17, a kind of a light source is selected in step 501 and then an initial operation for white balance control is actuated in step 502. As shown in FIG. 4, an initial value r–0 as the white balance control signal Rcont for a red signal and an initial value b–0 as the white balance control signal Bcont for a blue signal are output from the microcomputer 10. In a step 503, a variable region β is set. Then, integral averaged values of color difference signals white balance controlled R–Y and B–Y, which correspond to the values r–0 and b–0 of the white balance control signals Rcont and Bcont, are input to the microcomputer 10 and the integral averaged values of the color difference signals R–Y and B–Y and the reference values are compared in a step 504. As a result of a comparison, if differences between the integral averaged values of the color difference signals and the reference values are more than predetermined values, values of the white balance control signals Rcont and Bcont are stepped up (down) and then output. The values of the white balance control signals Rcont and Bcont are successively stepped up (down) and output until the differences between the integral averaged values of the color difference signals R–Y and B–Y and the reference values are less than the predetermined values. When the differences are less than the predetermined values (for example, 10 LSB [Least Significant Bit]), the values of the white balance control signals Rcont and Bcont become constant. However, the values of the white balance control signals Rcont and Bcont are limited within the variable region β in accordance with the kind of selected light source.

Figure 17:
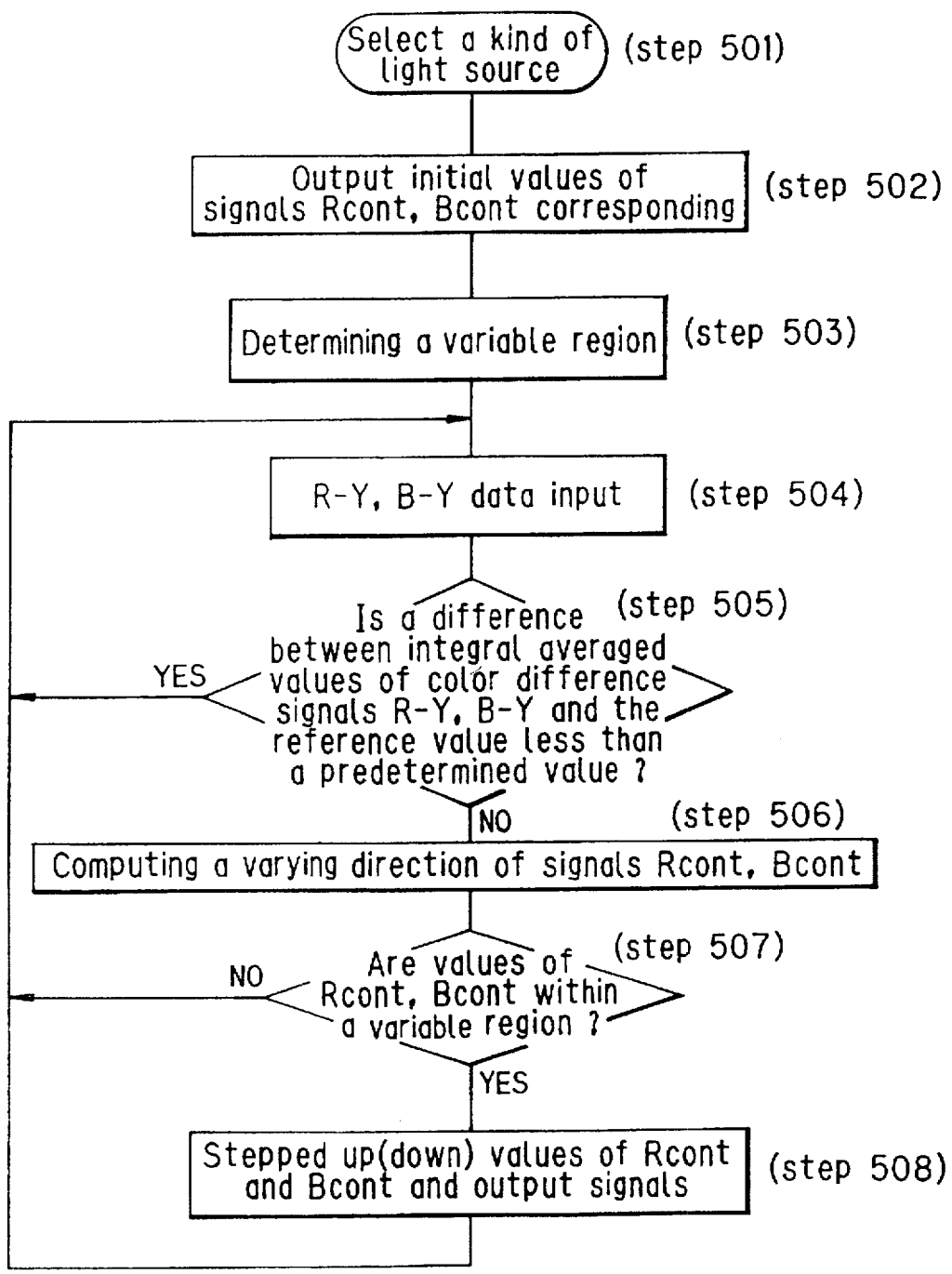
FIG. 17 shows a flow chart for the operation of an eighth embodiment of the present invention.

Further, the operation of steps 504 through 508 as shown in FIG. 17 will be explained. As described above, integral averaged values of the color difference signals R–Y and B–Y are input in the step 504 and then it is judged whether the integral averaged values of the color difference signals R–Y and B–Y and the reference values are less than the predetermined values in a step 505. If the difference is more than the predetermined values, then the white balance control is improper and the operation returns to the step 504 and the integral averaged values of the color difference signals R–Y and B–Y are input.

In the step 507, it is judged whether the present values of the white balance control signals Rcont and Bcont are within the variable region β selected in the step 503. If the values are within the variable region β, the operation goes to a step 508. In the step 508, the white balance control signals Rcont and Bcont are increased or decreased by one step value. In the step 506, it is judged whether the values should be increased or decreased. If the values are positioned out of the variable region β, the white balance control signals Rcont and Bcont are not output and the operation returns to the step 504.

After repeating an operation of the steps 504, 505, 506, 507, and 508 of a flow chart, the values of the white balance control signals Rcont and Bcont are successively changed within the variable region β. Gains of a red signal circuit and a blue signal circuit are changed within a variable region so that a deterioration of the reproduced color does not occur even though there is a difference between a selected light source and an actual color temperature.

As described above, according to the first embodiment of the present invention, a variable amount of white balance control signals are limited in the variable region so that color failure is prevented from occurring even if an object is photographed in which one specific color dominates.

The variable region can be renewed by the values of the white balance control signals converged or fixed. Thereby, a proper white balance is controlled even if the color temperature of the object is actually changed.

According to the second embodiment of the present invention, a variable region becomes narrow in a telescope condition for zooming. Thereby, color failure is prevented from occurring in the telescope condition.

According to the third- and fourth- embodiments of the present invention, values of white balance control signals are changed in order to equalize integral averaged values of color difference signals and the reference values when a difference between a present brightness value and a brightness value at the last converged time is more than a recognition level for changing brightness. Thereby, the white balance control device can control white balance properly without having color failure occur when an object is photographed under a light source or without a light source.

According to the fifth embodiment of the present invention, when a difference between the integral averaged values of color difference signals and the reference values is more than the switching values, that is, the values of the white balance control signals are quite different from the converged values, a converging period becomes shorter since output intervals of the white balance control signals are made to be shorter. When the difference between the integral averaged values and the reference values are less than the switching values, that is, the values of the white balance control signals are near to the converged values, the values are accurately converged without the occurrence of any hunting since output intervals of the white balance control signals are made to be longer.

According to the sixth embodiment of the present invnetion, after the values are converged once, output intervals of white balance control signals are made to be longer. When a color of an object is suddenly changed, white balance can be continuously controlled without changing the control condition of the white balance.

According to the seventh embodiment of the present invention, an outdoor mode and an indoor mode are provided and controllable regions are set for each mode in order to control white balance in the best condition.

In the seventh embodiment, after the white balance control signals converge once, a change from the outdoor mode to the indoor mode occurs responsive not only to the brightness value of an object but also to a difference between integral averaged values of color difference signals and the reference values. Therefore, a region for a corresponding mode is not changed even if a light object is photographed indoors and a dark object is photographed outdoors so that white balance is properly controlled. The region for the corresponding mode is changed when a color temperature is actually changed from an indoor condition to an outdoor condition.

According to the eighth embodiment of the present invention, when a light source is manually selected, a variable region is changed in accordance with a light source selected from white balance control signals, so that the white balance is properly controlled without a deterioration of the reproduced color even if there is a slight difference between a selected light source and an actual color temperature.

The invention being thus described, it will be obvious that the same may be varied in many ways. Such variations are not to be regarded as a depature from the sprit and scope of the invention, and all such modification as would be obvious to one skilled in the art are intended to be included within the scope of the following claims.

We claim:

1. A method for controlling white balance control signals, comprising the step of:

(a) manually selecting light sources;

(b) controlling white balance by controlling an amplification degree of a red elementary color signal and a blue elementary color signal out of red-, green-, and blue-elementary color signals;

(c) outputting first and second color difference signals by processing elementary color signals white balance controlled by said step (b);

(d) transmitting white balance control signals to said step (b), wherein said step (b) is actuated for equalizing integral averaged values of said first and second color difference signals, and reference values and predetermined integral averaged values for each first and second color difference signal are set as said reference values when an averaged color of all colors in a picture becomes an achromatic color at a reference color temperature;

said step (d) further includes determining initial values of white balance control signals for outputting and a variable region in order to control said values of said white balance control signals within said variable region; and (e) determining if said first and second color difference signals are within said variable region.

2. A method for controlling white balance control signals, comprising the step of:

(a) manually selecting light sources;

(b) controlling white balance by controlling an amplification degree of a red elementary color signal and a blue elementary color signal out of red-, green-, and blue-elementary color signals;

(c) outputting first and second color difference signals by processing elementary color signals white balance controlled by said step (b); and (d) transmitting white balance control signals to said step (b), wherein said step (b) is actuated for equalizing integral averaged values of said first and second color difference signals, and reference values and predetermined integral averaged values for each first and second color difference signal are set as said reference values when an averaged color of all colors in a picture becomes an achromatic color at a reference color temperature;

said step (d) further includes determining initial values of white balance control signals for outputting and a variable region in order to control said values of said white balance control signals within said variable region, wherein said equalizing in said step (b) includes determining whether a difference between said first and second color difference signals and a reference value is less than a predetermined value.

3. The method as recited in claim 2, wherein, if said determining step determines said predetermined value is exceeded, computing a varying direction of said first and second color difference signals.

4. The method as recited in claim 3, further comprising modifying said first and second color difference signals by a step value in accordance with said varying direction.

5. The method as recited in claim 4, wherein said steps of determining, computing and modifying are repeated until said difference is less than said predetermined value.

6. The method as recited in claim 3, further comprising determining if said first and second color difference signals are within said variable region.

7. The method as recited in claim 6, further comprising, when said first and second color difference signals are within said variable region, modifying said first and second color difference signals by a step value in accordance with said varying direction.

8. A white balance control device comprising:

light source selecting means for manually selecting light sources;

white balance control means for controlling white balance by controlling an amplification degree of red elementary color signal and a blue elementary color signal out of red-, green-, and blue-elementary color signals;

matrixing means for outputting first and second color difference signals by processing elementary color signals white balance controlled by said white balance control means; and processing means for transmitting white balance control signals to said white balance control means, wherein said white balance control means is actuated for equalizing integral averaged values of said first and second color difference signals, and reference values and predetermined integral averaged values for each first and second color difference signal are set as said reference values when an averaged color of all colors in a picture becomes an achromatic color at a reference color temperature;

wherein said processing means determines initial values of white balance control signals for outputting and a variable region in order to control said values of said white balance control signals within said variable region and wherein said white balance control means determines if said first and second color difference signals are within said variable region from said processing means.

9. A white balance control device comprising:

light source selecting means for manually selecting light sources;

white balance control means for controlling white balance by controlling an amplification degree of red elementary color signal and a blue elementary color signal out of red-, green-, and blue-elementary color signals;

matrixing means for outputting first and second color difference signals by processing elementary color signals white balance controlled by said white balance control means; and processing means for transmitting white balance control signals to said white balance control means, wherein said white balance control means is actuated for equalizing integral averaged values of said first and second color difference signals, and reference values and predetermined integral averaged values for each first and second color difference signal are set as said reference values when an averaged color of all colors in a picture becomes an achromatic color at a reference color temperature;

wherein said processing means determines initial values of white balance control signals for outputting and a variable region in order to control said values of said white balance control signals within said variable region and wherein said equalizing of said white balance control means includes determining whether a difference between said first and second color difference signals and a reference value is less than a predetermined value.

10. The device as recited in claim 9, wherein, if said white balance control means determines said predetermined value is exceeded, said white balance control means computes a varying direction of said first and second color difference signals.

11. The device as recited in claim 10, wherein said white balance control means modifies said first and second color difference signals by a step value in accordance with said varying direction.

12. The device as recited in claim 11, wherein said white balance control means repeats said determining, computes and modifies until said difference is less than said predetermined value.

13. The device as recited in claim 10, wherein said white balance control means determines if said first and second color difference signals are within said variable region from said processing means.

14. The device as recited in claim 13, wherein, when said first and second color difference signals are within said variable region, said white balance control means modifies said first and second color difference signals by a step value in accordance with said varying direction.

* * * * *